(12) United States Patent
Goenka

(10) Patent No.: US 8,631,659 B2
(45) Date of Patent: Jan. 21, 2014

(54) HYBRID VEHICLE TEMPERATURE CONTROL SYSTEMS AND METHODS

(75) Inventor: Lakhi Nandlal Goenka, Ann Arbor, MI (US)

(73) Assignee: BSST LLC, Northville, MI (US)

( * ) Notice: Subject to any disclaimer, the term of this patent is extended or adjusted under 35 U.S.C. 154(b) by 428 days.

(21) Appl. No.: 12/862,674

(22) Filed: Aug. 24, 2010

(65) Prior Publication Data

US 2010/0313576 A1 Dec. 16, 2010

Related U.S. Application Data

(63) Continuation of application No. 11/497,700, filed on Aug. 2, 2006, now Pat. No. 7,779,639.

(51) Int. Cl.
*F25B 21/02* (2006.01)
*B60H 1/32* (2006.01)
*F25B 41/00* (2006.01)

(52) U.S. Cl.
USPC .......... 62/3.61; 62/3.3; 62/244; 62/513

(58) Field of Classification Search
USPC ................... 62/239, 244, 3.3, 3.61
See application file for complete search history.

(56) References Cited

U.S. PATENT DOCUMENTS

| | | | |
|---|---|---|---|
| 413,136 A | 10/1889 | Dewey | |
| 2,363,168 A | 11/1944 | Findley | |
| 2,944,404 A | 7/1960 | Fritts | |
| 2,949,014 A | 8/1960 | Belton, Jr. et al. | |
| 2,984,077 A | 5/1961 | Gaskill | |
| 2,997,514 A | 8/1961 | Roeder, Jr. | |
| 3,085,405 A | 4/1963 | Frantti | |
| 3,125,860 A | 3/1964 | Reich | |
| 3,137,142 A | 6/1964 | Venema | |
| 3,138,934 A | 6/1964 | Roane | |
| 3,212,275 A | 10/1965 | Tillman, Jr. | |
| 3,213,630 A | 10/1965 | Mole | |
| 3,236,056 A | 2/1966 | Phillips et al. | |
| 3,252,504 A | 5/1966 | Newton | |

(Continued)

FOREIGN PATENT DOCUMENTS

CN 1195090 10/1998
DE 13 01 454 8/1969

(Continued)

OTHER PUBLICATIONS

Behr, "Thermal Management for Hybrid Vehicles," Power Point Presentation, Technical Press Day 2009, 20 pages.

(Continued)

*Primary Examiner* — Mohammad M Ali
*Assistant Examiner* — Christopher R Zerphey
(74) *Attorney, Agent, or Firm* — Knobbe, Martens, Olson & Bear, LLP

(57) ABSTRACT

A heating, ventilating and air conditioning (HVAC) system for a hybrid vehicle is disclosed, the HVAC system including at least one thermoelectric device for providing supplemental heating and cooling for air supplied to a passenger compartment of the vehicle. In some embodiments, the HVAC system has at least a first circuit and a second circuit. The first circuit can be configured to transfer heat to or from an electric side of the hybrid vehicle. The second circuit can be configured to transfer heat to or from a fuel-fed side of the hybrid vehicle.

35 Claims, 8 Drawing Sheets

(56) References Cited

U.S. PATENT DOCUMENTS

| | | | |
|---|---|---|---|
| 3,391,727 A | 7/1968 | Topouszian | |
| 3,527,621 A | 9/1970 | Newton | |
| 3,599,437 A | 8/1971 | Panas | |
| 3,635,037 A | 1/1972 | Hubert | |
| 3,681,929 A | 8/1972 | Schering | |
| 3,779,307 A | 12/1973 | Weiss et al. | |
| 3,817,043 A | 6/1974 | Zoleta | |
| 3,885,126 A | 5/1975 | Sugiyama et al. | |
| 4,038,831 A | 8/1977 | Gaudel et al. | |
| 4,051,691 A * | 10/1977 | Dawkins | 62/236 |
| 4,065,936 A | 1/1978 | Fenton et al. | |
| 4,280,330 A | 7/1981 | Harris et al. | |
| 4,494,380 A | 1/1985 | Cross | |
| 4,665,707 A | 5/1987 | Hamilton | |
| 4,665,971 A | 5/1987 | Sakurai | |
| 4,753,682 A | 6/1988 | Cantoni | |
| 4,823,554 A | 4/1989 | Trachtenberg et al. | |
| 4,848,090 A | 7/1989 | Peters | |
| 4,858,069 A | 8/1989 | Hughes | |
| 4,905,475 A | 3/1990 | Tuomi | |
| 4,907,060 A | 3/1990 | Nelson et al. | |
| 4,922,721 A | 5/1990 | Robertson et al. | |
| 4,922,998 A | 5/1990 | Carr | |
| 4,947,735 A | 8/1990 | Guillemin | |
| 4,988,847 A | 1/1991 | Argos et al. | |
| 5,029,446 A | 7/1991 | Suzuki | |
| 5,038,569 A | 8/1991 | Shirota et al. | |
| 5,042,566 A | 8/1991 | Hildebrand | |
| 5,092,129 A | 3/1992 | Bayes et al. | |
| 5,097,829 A | 3/1992 | Quisenberry | |
| 5,111,664 A | 5/1992 | Yang | |
| 5,119,640 A | 6/1992 | Conrad | |
| 5,167,129 A | 12/1992 | Akasaka | |
| 5,193,347 A | 3/1993 | Apisdorf | |
| 5,198,930 A | 3/1993 | Muratomi | |
| 5,232,516 A | 8/1993 | Hed | |
| 5,269,146 A | 12/1993 | Kerner | |
| 5,291,960 A | 3/1994 | Brandenburg et al. | |
| 5,300,197 A | 4/1994 | Mitani et al. | |
| 5,303,771 A | 4/1994 | Des Champs | |
| 5,316,078 A | 5/1994 | Cesaroni | |
| 5,385,020 A | 1/1995 | Gwilliam et al. | |
| 5,386,823 A | 2/1995 | Chen | |
| 5,407,130 A | 4/1995 | Uyeki et al. | |
| 5,431,021 A | 7/1995 | Gwilliam et al. | |
| 5,448,891 A | 9/1995 | Nakagiri et al. | |
| 5,450,894 A | 9/1995 | Inoue et al. | |
| 5,483,807 A | 1/1996 | Abersfelder et al. | |
| 5,499,504 A | 3/1996 | Mill et al. | |
| 5,549,153 A | 8/1996 | Baruschke et al. | |
| 5,566,774 A | 10/1996 | Yoshida | |
| 5,576,512 A | 11/1996 | Doke | |
| 5,592,363 A | 1/1997 | Atarashi et al. | |
| 5,605,047 A | 2/1997 | Park et al. | |
| 5,653,111 A | 8/1997 | Attey et al. | |
| 5,673,964 A | 10/1997 | Roan et al. | |
| 5,713,426 A | 2/1998 | Okamura | |
| 5,722,249 A | 3/1998 | Miller, Jr. | |
| 5,724,818 A | 3/1998 | Iwata et al. | |
| 5,725,048 A | 3/1998 | Burk et al. | |
| 5,802,856 A | 9/1998 | Schaper et al. | |
| 5,816,236 A | 10/1998 | Moroi et al. | |
| 5,890,371 A | 4/1999 | Rajasubramanian et al. | |
| 5,899,086 A | 5/1999 | Noda et al. | |
| 5,901,572 A | 5/1999 | Peiffer et al. | |
| RE36,242 E | 6/1999 | Apisdorf | |
| 5,918,930 A | 7/1999 | Kawai et al. | |
| 5,921,088 A | 7/1999 | Imaizumi et al. | |
| 5,955,772 A | 9/1999 | Shakouri et al. | |
| 5,964,092 A | 10/1999 | Tozuka et al. | |
| 5,966,941 A | 10/1999 | Ghoshal | |
| 5,975,856 A | 11/1999 | Welle | |
| 5,977,785 A | 11/1999 | Burward-Hoy | |
| 5,987,890 A | 11/1999 | Chiu et al. | |
| 6,050,326 A | 4/2000 | Evans | |
| 6,059,198 A | 5/2000 | Moroi et al. | |
| 6,082,445 A | 7/2000 | Dugan | |
| 6,084,172 A | 7/2000 | Kishi et al. | |
| 6,105,659 A | 8/2000 | Pocol et al. | |
| 6,119,463 A | 9/2000 | Bell | |
| 6,122,588 A | 9/2000 | Shehan et al. | |
| 6,138,749 A | 10/2000 | Kawai et al. | |
| 6,158,225 A | 12/2000 | Muto et al. | |
| 6,203,939 B1 | 3/2001 | Wilson | |
| 6,205,802 B1 * | 3/2001 | Drucker et al. | 62/236 |
| 6,205,805 B1 | 3/2001 | Takahashi et al. | |
| 6,213,198 B1 | 4/2001 | Shikata et al. | |
| 6,223,539 B1 | 5/2001 | Bell | |
| 6,270,015 B1 | 8/2001 | Hirota | |
| 6,282,907 B1 | 9/2001 | Ghoshal | |
| 6,293,107 B1 | 9/2001 | Kitagawa | |
| 6,324,860 B1 | 12/2001 | Maeda et al. | |
| 6,334,311 B1 | 1/2002 | Kim et al. | |
| 6,346,668 B1 | 2/2002 | McGrew | |
| 6,347,521 B1 | 2/2002 | Kadotani et al. | |
| 6,366,832 B2 | 4/2002 | Lomonaco et al. | |
| 6,393,842 B2 | 5/2002 | Kim | |
| 6,401,462 B1 | 6/2002 | Bielinski | |
| 6,412,287 B1 | 7/2002 | Hughes et al. | |
| 6,438,964 B1 | 8/2002 | Giblin | |
| 6,457,324 B2 | 10/2002 | Zeigler et al. | |
| 6,464,027 B1 | 10/2002 | Dage et al. | |
| 6,474,081 B1 * | 11/2002 | Feuerecker | 62/99 |
| 6,481,213 B2 | 11/2002 | Carr et al. | |
| 6,510,696 B2 | 1/2003 | Guttman et al. | |
| 6,530,231 B1 | 3/2003 | Nagy et al. | |
| 6,530,920 B1 | 3/2003 | Whitcroft et al. | |
| 6,539,725 B2 * | 4/2003 | Bell | 62/3.7 |
| 6,539,729 B2 | 4/2003 | Tupis et al. | |
| 6,554,088 B2 | 4/2003 | Severinsky et al. | |
| 6,560,968 B2 | 5/2003 | Ko | |
| 6,569,550 B2 * | 5/2003 | Khelifa | 429/434 |
| RE38,128 E | 6/2003 | Gallup et al. | |
| 6,598,403 B1 | 7/2003 | Ghoshal | |
| 6,605,773 B2 | 8/2003 | Kok | |
| 6,606,877 B2 | 8/2003 | Tomita et al. | |
| 6,611,115 B2 | 8/2003 | Wakashiro et al. | |
| 6,640,889 B1 | 11/2003 | Harte et al. | |
| 6,653,002 B1 | 11/2003 | Parise | |
| 6,682,844 B2 | 1/2004 | Genc | |
| 6,705,089 B2 | 3/2004 | Chu et al. | |
| 6,722,139 B2 | 4/2004 | Moon et al. | |
| 6,732,534 B2 | 5/2004 | Spry | |
| 6,779,348 B2 | 8/2004 | Taban | |
| 6,792,259 B1 | 9/2004 | Parise | |
| 6,796,399 B2 | 9/2004 | Satou et al. | |
| 6,803,766 B2 | 10/2004 | Kobayashi et al. | |
| 6,807,811 B2 | 10/2004 | Lee | |
| 6,810,977 B2 | 11/2004 | Suzuki | |
| 6,862,892 B1 * | 3/2005 | Meyer et al. | 62/115 |
| 6,883,602 B2 | 4/2005 | Drucker | |
| 6,886,356 B2 | 5/2005 | Kubo et al. | |
| 6,894,369 B2 | 5/2005 | Irino et al. | |
| 6,896,047 B2 | 5/2005 | Currle et al. | |
| 6,907,739 B2 | 6/2005 | Bell | |
| 6,942,728 B2 | 9/2005 | Caillat et al. | |
| 6,973,799 B2 | 12/2005 | Kuehl et al. | |
| 6,986,247 B1 | 1/2006 | Parise | |
| 7,007,491 B2 | 3/2006 | Grimm et al. | |
| 7,089,756 B2 | 8/2006 | Hu | |
| 7,100,369 B2 | 9/2006 | Yamaguchi et al. | |
| 7,134,288 B2 | 11/2006 | Crippen et al. | |
| 7,246,496 B2 | 7/2007 | Goenka et al. | |
| 7,310,953 B2 | 12/2007 | Pham et al. | |
| 7,363,766 B2 | 4/2008 | Eisenhour | |
| 7,380,586 B2 | 6/2008 | Gawthrop | |
| 7,426,835 B2 | 9/2008 | Bell | |
| 7,743,614 B2 | 6/2010 | Goenka et al. | |
| 7,779,639 B2 | 8/2010 | Goenka | |
| 7,926,293 B2 | 4/2011 | Bell | |
| 8,104,294 B2 | 1/2012 | Reeve | |
| 8,408,012 B2 | 4/2013 | Goenka et al. | |
| 2001/0029974 A1 | 10/2001 | Cohen et al. | |
| 2003/0084935 A1 | 5/2003 | Bell | |

(56) References Cited

U.S. PATENT DOCUMENTS

| | | |
|---|---|---|
| 2003/0140636 A1 | 7/2003 | Van Winkle |
| 2004/0025516 A1 | 2/2004 | Van Winkle |
| 2004/0050076 A1 | 3/2004 | Palfy et al. |
| 2004/0093889 A1 | 5/2004 | Bureau et al. |
| 2004/0098991 A1 | 5/2004 | Heyes |
| 2004/0237541 A1 | 12/2004 | Murphy |
| 2004/0261829 A1 | 12/2004 | Bell |
| 2005/0000473 A1 | 1/2005 | Ap et al. |
| 2005/0011199 A1 | 1/2005 | Grisham et al. |
| 2005/0061497 A1 | 3/2005 | Amaral |
| 2005/0067862 A1 | 3/2005 | Iqbal et al. |
| 2005/0074646 A1 | 4/2005 | Rajashekara et al. |
| 2005/0081834 A1 | 4/2005 | Perkins |
| 2005/0139692 A1 | 6/2005 | Yamamoto |
| 2005/0178128 A1 | 8/2005 | Harwood et al. |
| 2005/0247336 A1 | 11/2005 | Inaoka |
| 2005/0257531 A1 | 11/2005 | Kadle et al. |
| 2005/0263177 A1 | 12/2005 | Bell |
| 2005/0268621 A1 | 12/2005 | Kadle et al. |
| 2005/0278863 A1 | 12/2005 | Bahash et al. |
| 2006/0005548 A1 | 1/2006 | Ruckstuhl |
| 2006/0011152 A1 | 1/2006 | Hayes |
| 2006/0075758 A1 | 4/2006 | Rice et al. |
| 2006/0130490 A1 | 6/2006 | Petrovski |
| 2006/0150657 A1 | 7/2006 | Spurgeon et al. |
| 2006/0157102 A1 | 7/2006 | Nakajima et al. |
| 2006/0188418 A1 | 8/2006 | Park et al. |
| 2006/0225441 A1 | 10/2006 | Goenka et al. |
| 2006/0254284 A1 | 11/2006 | Ito et al. |
| 2006/0254285 A1 | 11/2006 | Lin |
| 2007/0000255 A1 | 1/2007 | Elliot et al. |
| 2007/0017666 A1 | 1/2007 | Goenka et al. |
| 2007/0056295 A1 | 3/2007 | De Vilbiss |
| 2007/0193617 A1 | 8/2007 | Taguchi |
| 2007/0214799 A1 | 9/2007 | Goenka |
| 2007/0272290 A1 | 11/2007 | Sims et al. |
| 2008/0017362 A1 | 1/2008 | Kwon et al. |
| 2008/0028768 A1 | 2/2008 | Goenka |
| 2008/0230618 A1 | 9/2008 | Gawthrop |
| 2008/0250794 A1 | 10/2008 | Bell |
| 2008/0307796 A1 | 12/2008 | Bell et al. |
| 2009/0000310 A1 | 1/2009 | Bell et al. |
| 2009/0007572 A1 | 1/2009 | Bell et al. |
| 2010/0052374 A1 | 3/2010 | Bell et al. |
| 2010/0101238 A1 | 4/2010 | LaGrandeur et al. |
| 2010/0101239 A1 | 4/2010 | LaGrandeur et al. |
| 2010/0112419 A1 | 5/2010 | Jang et al. |
| 2010/0155018 A1 | 6/2010 | Goenka et al. |
| 2010/0287952 A1 | 11/2010 | Goenka |
| 2010/0291414 A1 | 11/2010 | Bell et al. |
| 2011/0067742 A1 | 3/2011 | Bell et al. |
| 2011/0079023 A1 | 4/2011 | Goenka et al. |
| 2011/0107773 A1 | 5/2011 | Gawthrop |
| 2011/0236731 A1 | 9/2011 | Bell et al. |

FOREIGN PATENT DOCUMENTS

| | | |
|---|---|---|
| DE | 2319155 | 10/1974 |
| DE | 197 30 678 | 1/1999 |
| DE | 198 29 440 | 1/2000 |
| DE | 199 51 224 | 5/2001 |
| DE | 20 105 487 | 10/2001 |
| EP | 0 389 407 | 9/1990 |
| EP | 0418995 B1 | 3/1991 |
| EP | 0 545 021 | 6/1993 |
| EP | 0 791 497 | 8/1997 |
| EP | 1641067 A1 | 3/2006 |
| EP | 1 932 695 A1 | 6/2008 |
| FR | 2806666 | 9/2001 |
| GB | 231 192 A | 5/1926 |
| GB | 1 040 485 | 8/1966 |
| GB | 2 267 338 | 12/1993 |
| GB | 2 333 352 | 7/1999 |
| JP | 56-18231 | 2/1981 |
| JP | 01 131830 A | 5/1989 |
| JP | 01 200122 | 8/1989 |
| JP | 01 281344 | 11/1989 |
| JP | 04 103925 | 4/1992 |
| JP | 4-165234 | 6/1992 |
| JP | 6-024235 | 2/1994 |
| JP | 07-54189 | 6/1995 |
| JP | 07-253224 | 10/1995 |
| JP | 08-316388 | 11/1996 |
| JP | 09042801 | 2/1997 |
| JP | 09-254630 | 9/1997 |
| JP | 10035268 | 2/1998 |
| JP | 11-342731 | 12/1999 |
| JP | 2000 130883 A1 | 5/2000 |
| JP | 2000-161721 | 6/2000 |
| JP | 2000-274788 | 6/2000 |
| JP | 2000-274874 | 10/2000 |
| JP | 2000-318434 | 11/2000 |
| JP | 2002-13758 | 1/2002 |
| JP | 2002059736 A | 2/2002 |
| JP | 2004 050874 | 2/2004 |
| JP | 2005 212564 | 8/2005 |
| JP | 2006 015965 | 1/2006 |
| KR | 2001 111646 | 12/2001 |
| LU | 66619 | 2/1973 |
| SE | 337 227 | 5/1971 |
| SU | 184886 A | 7/1966 |
| WO | WO 95/01500 | 1/1995 |
| WO | WO 96/05475 | 2/1996 |
| WO | WO 97/47930 | 12/1997 |
| WO | WO 99/10191 | 3/1999 |
| WO | WO 99/58907 | 11/1999 |
| WO | WO 02/00458 | 1/2002 |
| WO | WO 03/014634 | 2/2003 |
| WO | WO 2005/023571 | 3/2005 |
| WO | WO 2005/063567 | 7/2005 |
| WO | WO 2005063567 A1 * | 7/2005 |
| WO | WO 2006/037178 A | 4/2006 |
| WO | WO 2006/064432 | 6/2006 |
| WO | WO 2007/001289 | 1/2007 |
| WO | WO 2008/147305 A1 | 4/2008 |
| WO | WO 2008/123663 | 10/2008 |
| WO | WO 2008/148042 | 12/2008 |
| WO | WO 2010/048575 | 4/2010 |

OTHER PUBLICATIONS

Heckenberger, Thomas, "Li-on Battery Cooling," BEHR Power Point Presentation, Technical Press Day, Stuttgart, May 20, 2009, 13 pages.

Jeon et al., "Development of Battery Pack Design for High Power Li-Ion Battery Pack of HEV", The World Electric Vehicle Association Journal, 2007, vol. 1, pp. 94-99.

Sabbah et al., "Passive Thermal Management System for Plug-in Hybrid and Comparison with Active Cooling: Limitation of Temperature Rise and Uniformity of Temperature Distribution", ECS Transactions, 2008, vol. 13, Issue 19, pp. 41-52.

Lofy, John et al., "Thermoelectrics for Environmental Control Automobiles," 21st International Conference on Thermoelectronics, 2002, p. 471-476.

* cited by examiner

HYBRID VEHICLE TEMPERATURE CONTROL SYSTEMS AND METHODS

CROSS-REFERENCE TO RELATED APPLICATIONS

This application is a continuation of U.S. application Ser. No. 11/497,700, filed Aug. 2, 2006 now U.S. Pat. No. 7,779,639, titled HVAC SYSTEM FOR HYBRID VEHICLES USING THERMOELECTRIC DEVICES, the entire contents of which are incorporated by reference herein and made a part of this specification.

BACKGROUND

1. Field

The invention relates to a heating, ventilating and air conditioning (HVAC) system for a vehicle and more particularly to a HVAC system for a hybrid vehicle, the HVAC system including at least one thermoelectric device for providing supplemental heating and cooling for air supplied to a passenger compartment of the vehicle.

2. Description of Related Art

A passenger compartment of a vehicle is typically heated and cooled by a heating, ventilating, and air conditioning (HVAC) system. The HVAC system directs a flow of air through a heat exchanger to heat or cool the air prior to flowing into the passenger compartment. In the heat exchanger, energy is transferred between the air and a coolant such as a water-glycol coolant, for example. The air is normally supplied from ambient air or a mixture of air re-circulated from the passenger compartment and ambient air. Energy for heating and cooling of the passenger compartment of the vehicle is typically supplied from a fuel fed engine such as an internal combustion engine, for example.

In a hybrid vehicle, both a fuel fed engine and an electric motor are used to power a drive system for the vehicle. Thus, at times the fuel fed engine may be operating, the electric motor may be operating, and both the fuel fed engine and the electric motor may be operating. Therefore, the HVAC system in the hybrid vehicle must be capable of heating and cooling air during each of these operating modes. Examples of such systems are shown and described in commonly owned U.S. patent application Ser. No. 11/101,871 filed Apr. 8, 2005, hereby incorporated herein by reference in its entirety, and U.S. patent application Ser. No. 11/184,447 filed Jul. 19, 2005, hereby incorporated herein by reference in its entirety. If the fuel fed engine must be operating in order to operate the HVAC system in the hybrid vehicle, an efficiency thereof is reduced.

It would be desirable to produce a heating, ventilating, and air conditioning system for a hybrid vehicle, wherein an efficiency of operation of the hybrid vehicle during operation of the HVAC system is maximized.

SUMMARY

Consistent and consonant with the present invention, a heating, ventilating, and air conditioning system for a hybrid vehicle, wherein an efficiency of operation of the hybrid vehicle during operation of the HVAC system is maximized, has surprisingly been discovered.

In one embodiment, the heating, ventilating, and air conditioning system for a hybrid vehicle comprises a first fluid circuit including a first conduit for conveying a first fluid therein, the first circuit in thermal communication with an electric side of the hybrid vehicle; a second fluid circuit including a second conduit for conveying the first fluid therein, the second circuit in thermal communication with a fuel fed side of the hybrid vehicle; a first thermoelectric device having a first heat transfer surface and a second heat transfer surface, the first heat transfer surface in thermal communication with at least one of the first circuit and the second circuit, the second heat transfer surface adapted to be in thermal communication with an air stream; and a first heat exchanger disposed in the air stream and in thermal communication with the second fluid circuit, wherein the first circuit, the second circuit, the first thermoelectric device, and the first heat exchanger cooperate to condition the air stream.

In another embodiment, the heating, ventilating, and air conditioning system for a hybrid vehicle comprises a first conduit forming a first circuit for conveying a first fluid therein; a second conduit forming a second circuit for conveying the first fluid therein; a third conduit for conveying a second fluid therein; a first thermoelectric device having a first heat transfer surface and a second heat transfer surface, the first heat transfer surface in thermal communication with one of the first conduit and the second conduit, the second heat transfer surface in thermal communication with the third conduit; a first heat exchanger disposed in an air stream and in thermal communication with the second conduit; and a second heat exchanger disposed in the air stream downstream of the first heat exchanger and in thermal communication with the third conduit, wherein the first conduit, the second conduit, the third conduit, the first thermoelectric device, the first heat exchanger, and the second heat exchanger cooperate to condition the air stream.

In another embodiment, the heating, ventilating, and air conditioning system for a hybrid vehicle comprises a first conduit for conveying a first fluid; a second conduit for conveying the first fluid; a third conduit for conveying a second fluid; a first thermoelectric device having a first heat transfer surface and a second heat transfer surface, the first heat transfer surface of the first thermoelectric device in thermal communication with one of the first conduit and the second conduit, the second heat transfer surface of the first thermoelectric device in thermal communication with the third conduit; a first heat exchanger disposed in an air stream and in thermal communication with the second conduit, the first heat exchanger providing a selective heating of the air stream; a second heat exchanger disposed in the air stream downstream of the first heat exchanger and in thermal communication with the third conduit, the second heat exchanger providing selective heating and cooling of the air stream; and a third heat exchanger disposed in the air stream downstream of the second heat exchanger adapted to be in thermal communication with a source of heat to provide selective heating of the air stream, wherein the first conduit, the second conduit, the third conduit, the first thermoelectric device, the first heat exchanger, the second heat exchanger, and the third heat exchanger cooperate to condition the air stream.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF PREFERRED EMBODIMENTS

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
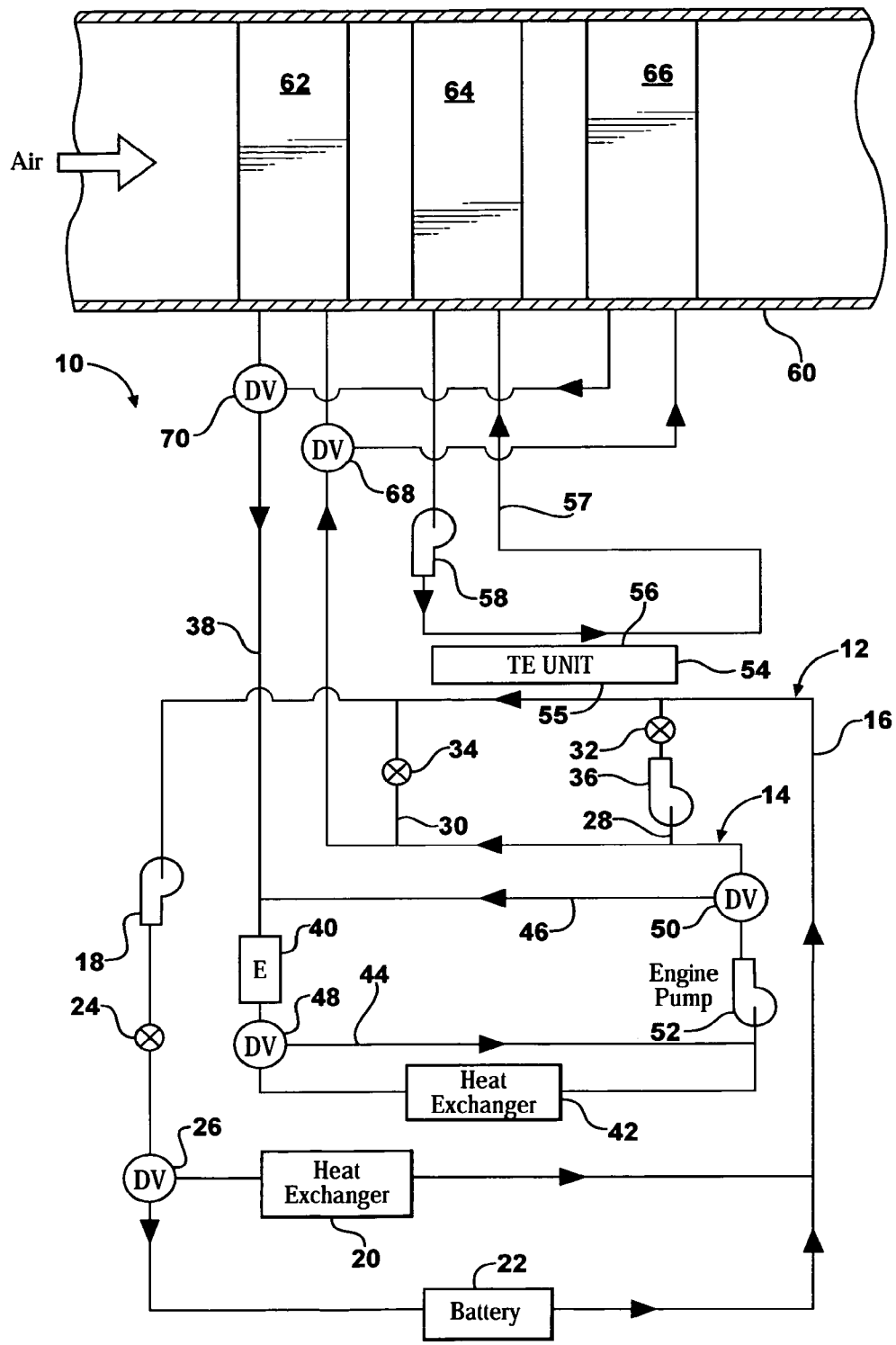
FIG. 1 is a schematic flow diagram of a heating, ventilating, and air conditioning (HVAC) system according to an embodiment of the invention.

FIG. 1 shows a heating ventilating, and air conditioning (HVAC) system 10 for supplying conditioned air to a passenger compartment of a vehicle according to an embodiment of the invention. The system 10 includes a first fluid circuit 12 and a second fluid circuit 14. In the embodiment shown, the first circuit 12 communicates with components of an electric side of a hybrid vehicle (not shown) and the second circuit 14 communicates with components of a fuel fed side of the hybrid vehicle. As used herein, electric side is meant to include components relating to an electric motor for powering the hybrid vehicle such as a battery compartment, for example. Fuel fed side is meant to include components relating to a fuel fed engine for powering the hybrid vehicle such as an internal combustion engine, for example. A first fluid (not shown) is circulated in the first circuit 12 and the second circuit 14 and can be any conventional fluid such as air or a coolant such as a water-glycol coolant, for example.

The first circuit 12 includes a first conduit 16 for conveying the first fluid through the first circuit 12. A pump 18 is disposed in the first conduit 16 to circulate the first fluid therethrough. A pump as used herein is meant to include any conventional pump such as a centrifugal pump, for example, a fan, and the like. The first conduit 16 includes a heat exchanger 20 disposed therein. The heat exchanger 20 can be any conventional heat exchanger such as a low temperature core, for example. The first fluid is also circulated through a battery compartment or other source of heat 22 from the electric side of the hybrid vehicle to remove heat therefrom. In the embodiment shown, the battery compartment 22 is disposed in parallel with the heat exchanger 20. However, it is understood that other configurations can be used as desired such as in series or a separate conduit, for example. A flow valve 24 and a diverter valve 26 are also disposed in the first conduit 16. It is understood that more or fewer valves may be used as desired to control flow of the first fluid through the first conduit 16. The flow valve 24 can be any conventional type such as a gate valve, a ball valve, a flap type valve, and the like, for example. The diverter valve 26 can be any conventional diverter valve such as a three way valve used to selectively permit flow between conduit branches, for example.

Crossover conduits 28, 30 are provided between the first circuit 12 and the second circuit 14. Flow valves 32, 34 are provided in respective crossover conduits 28, 30 to selectively permit flow of the first fluid therethrough. A pump 36 is also provided in the crossover conduit 28 to assist with circulation of the first fluid, if necessary.

A second conduit 38 is included in the second circuit 14. The second conduit 38 is in fluid communication with an engine 40 of the hybrid vehicle to circulate the first fluid therethrough and remove heat therefrom. A heat exchanger 42 is disposed in the second conduit 38 downstream of the engine 40. The heat exchanger 42 can be any conventional heat exchanger such as a radiator for the vehicle, for example. A first bypass conduit 44 is provided to permit bypassing of the heat exchanger 42 and a second bypass conduit 46 is provided to create a recirculation circuit. A diverter valve 48 selectively permits flow between the heat exchanger 42 and the first bypass conduit 44. Selective flow for the second bypass conduit 46 is facilitated by a diverter valve 50. It is understood that more or fewer valves may be used as desired to control flow of the first fluid through the second conduit 38. A pump 52 is disposed in the second conduit 38 to circulate the first fluid therethrough.

A first thermoelectric device (TED) 54 is disposed adjacent the first conduit 16 and between the crossover conduits 28, 30. The first TED 54 includes a first heat transfer surface 55 and a second heat transfer surface 56. The first heat transfer surface 55 is in thermal communication with the first conduit 16 of the first circuit 12. The first TED 54 is in electrical communication with a control system (not shown). The control system controls an electric current sent to the first TED 54. When the current is delivered in one direction, one of the first heat transfer surface 55 and the second heat transfer surface 56 generates thermal energy or heat and the other of the first heat transfer surface 55 and the second heat transfer surface 56 absorbs thermal energy or heat. When the current is reversed, the one of the first heat transfer surface 55 and the second heat transfer surface 56 which was generating heat now absorbs heat and the other of the first heat transfer surface 55 and the second heat transfer surface 56 now generates heat. Additionally, when the current is increased, a heating and cooling capacity of the TED is increased. Likewise, when the current is decreased, the heating and cooling capacity of the TED is decreased.

The TED 54 may be any conventional device such as: those produced by Marlow Industries, Inc. of Dallas, Tex.; the thermoelectric systems described in U.S. Pat. No. 6,539,725 to Bell; a quantum tunneling converter; a Peltier device; a thermoionic module; a magneto caloric module; an acoustic heating mechanism; a solid state heat pumping device; and the like; for example; or any combination of the devices listed above. Although a single thermoelectric device is shown, it is understood that additional thermoelectric devices can be used, as desired.

A third conduit 57 is in thermal communication with the second heat transfer surface 56 of the first TED 54. The third conduit 57 conveys a second fluid (not shown). The second fluid can be any conventional fluid such as air or a coolant such as a water-glycol coolant, for example. A pump 58 is disposed in the third conduit 57 to circulate the second fluid therethrough.

An air conduit 60 in fluid communication with a source of air (not shown) is provided to supply the conditioned air to the passenger compartment of the vehicle. The air conduit 60 includes a first heat exchanger 62, a second heat exchanger 64, and a third heat exchanger 66 disposed therein. The heat exchangers 62, 64, 66 can be any conventional type of heat exchanger.

The first heat exchanger 62 and the third heat exchanger 66 are in fluid communication with the second circuit 14. A diverter valve 68 is disposed in a supply side of the second conduit 38 to selectively control flow of the first fluid to the first heat exchanger 62 and the third heat exchanger 66. A diverter valve 70 is disposed in the second conduit 38 on a return side thereof to selectively control flow of the first fluid from the first heat exchanger 62 and the third heat exchanger 66.

The second heat exchanger 64 is in fluid communication with the third conduit 57. The third conduit 57 circulates the second fluid between the first TED 54 and the second heat exchanger 64.

In operation, the system 10 conditions the air flowing from the source of air for supply of the conditioned air to the passenger compartment of the vehicle. A flow direction of the air from the source of air is indicated by the arrow in the air conduit 60. The system 10 can operate in a heating mode, a demisting mode, and a cooling mode.

In a first heating mode where the engine 40 is operating and the electric motor is not operating, the first heat exchanger 62 and the second heat exchanger 64 transfer heat into the air stream, and the third heat exchanger 66 is idle. Thus, the diverter valves 68, 70 are positioned to militate against flow of the first fluid to the third heat exchanger 66 and permit flow to the first heat exchanger 62. The pump 52 of the second circuit 14 is operating to circulate the first fluid through the second conduit 38. Heat is transferred into the first fluid by the engine 40.

The diverter valve 48 is positioned to militate against flow through the heat exchanger 42 and permit flow through the first bypass conduit 44. Thus, heat is not removed from the first fluid in the heat exchanger 42 and the first fluid flows through the first bypass conduit 44. The diverter valve 50 is in a position to militate against flow of the first fluid through the second bypass conduit 46. Therefore, the first fluid flows through the second conduit 38 to the first heat exchanger 62 where heat is transferred from the first fluid to the air flowing in the air conduit 60.

The pump 18 of the first circuit 12 is not operating to circulate the first fluid through the first conduit 16. In order to supply the first fluid to the first TED 54, the pump 36 is operating and the valves 32, 34 of the crossover conduits 28, 30 are open to permit flow therethrough. A portion of the flow of the first fluid in the second conduit 38 is directed through the crossover conduit 28 and into thermal communication with the first heat transfer surface 55 of the first TED 54. The controller causes the current to the first TED 54 to flow to cause the first heat transfer surface 55 to absorb heat and remove heat from the first fluid. The first fluid then flows through the crossover conduit 30 to re-enter the second conduit 38 and flow to the first heat exchanger 62.

The pump 58 is operating to circulate the second fluid through the third conduit 57. The second fluid is in thermal communication with the second heat transfer surface 56 of the first TED 54. The second heat transfer surface 56 generates heat which is transferred to the second fluid. Thus, the second fluid flows to the second heat exchanger 64 where heat is transferred from the second fluid to the air flowing in the air conduit 60. Therefore, heated air is delivered to the passenger compartment of the vehicle from the first heat exchanger 62 and the second heat exchanger 64. It is understood that this mode can be used with only the first heat exchanger 62 transferring heat into the air stream and the second heat exchanger 64 idle.

In a second heating mode where the engine 40 is operating and the electric motor is operating, the first heat exchanger 62 and the second heat exchanger 64 transfer heat into the air stream, and the third heat exchanger 66 is idle. Thus, the diverter valves 68, 70 are positioned to militate against flow of the first fluid to the third heat exchanger 66 and permit flow to the first heat exchanger 62. The pump 52 of the second circuit 14 is operating to circulate the first fluid through the second conduit 38. Heat is transferred into the first fluid by the engine 40.

The diverter valve 48 is positioned to militate against flow through the heat exchanger 42 and permit flow through the first bypass conduit 44. Thus, heat is not removed from the first fluid in the heat exchanger 42 and the first fluid flows through the first bypass conduit 44. The diverter valve 50 is in a position to militate against flow of the first fluid through the second bypass conduit 46. Therefore, the first fluid flows through the second conduit 38 to the first heat exchanger 62 where heat is transferred from the first fluid to the air flowing in the air conduit 60.

The pump 18 of the first circuit 12 is operating to circulate the first fluid through the first conduit 16 to supply the first fluid to the first TED 54. The pump 36 is not operating and the valves 32, 34 of the crossover conduits 28, 30 are closed to militate against flow therethrough. The first fluid flows through the battery compartment 22 where heat is transferred into the first fluid, then through the first conduit 16, and into thermal communication with the first heat transfer surface 55 of the first TED 54. The diverter valve 26 is positioned to militate against flow through the heat exchanger 20 and permit flow to the battery compartment 22. Thus, heat is not removed from the first fluid in the heat exchanger 20. The controller causes the current to the first TED 54 to flow to cause the first heat transfer surface 55 to absorb heat and remove heat from the first fluid. The first fluid then returns to the pump 18 for recirculation.

The pump 58 is operating to circulate the second fluid through the third conduit 57. The second fluid is in thermal communication with the second heat transfer surface 56 of the first TED 54. The second heat transfer surface 56 generates heat which is transferred to the second fluid. Thus, the second fluid flows to the second heat exchanger 64 where heat is transferred from the second fluid to the air flowing in the air conduit 60. Therefore, heated air is delivered to the passenger compartment of the vehicle from the first heat exchanger 62 and the second heat exchanger 64.

In a third heating mode where the engine 40 is not operating and the electric motor is operating, the second heat exchanger 64 transfers heat into the air stream, and the first heat exchanger 62 and the third heat exchanger 66 are idle. Initially, it is presumed that the engine 40 was previously running and requires cooling. The pump 52 of the second circuit 14 is operating to circulate the first fluid through the second conduit 38. Heat is transferred into the first fluid by the engine 40.

The diverter valve 48 is positioned to militate against flow through the first bypass conduit 44 and permit flow through the heat exchanger 42. Thus, heat is removed from the first fluid in the heat exchanger 42. The diverter valve 50 is in a position to permit flow of the first fluid through the second bypass conduit 46 and militate against flow through the second conduit 38 to the first heat exchanger 62 and the third heat exchanger 66. Once the engine 40 has sufficiently cooled, the pump 52 can be switched to the off position until the engine 40 requires additional cooling.

The pump 18 of the first circuit 12 is operating to circulate the first fluid through the first conduit 16 to supply the first fluid to the first TED 54. The pump 36 is not operating and the valves 32, 34 of the crossover conduits 28, 30 are closed to militate against flow therethrough. The first fluid flows through the battery compartment 22 where heat is transferred into the first fluid, then through the first conduit 16, and into thermal communication with the first heat transfer surface 55 of the first TED 54. The diverter valve 26 is positioned to militate against flow through the heat exchanger 20 and permit flow to the battery compartment 22. Thus, heat is not removed from the first fluid in the heat exchanger 20. The controller causes the current to the first TED 54 to flow to cause the first heat transfer surface 55 to absorb heat and remove heat from the first fluid. The first fluid then returns to the pump 18 for recirculation.

The pump 58 is operating to circulate the second fluid through the third conduit 57. The second fluid is in thermal communication with the second heat transfer surface 56 of the first TED 54. The second heat transfer surface 56 generates heat which is transferred to the second fluid. Thus, the second fluid flows to the second heat exchanger 64 where heat is transferred from the second fluid to the air flowing in the air conduit 60. Therefore, heated air is delivered to the passenger compartment of the vehicle from the second heat exchanger 64. It is also understood that this mode can be used when both the engine 40 and the electric motor are operating, but where the amount heat required to be delivered to the passenger compartment of the vehicle is low.

In a demisting mode, the engine 40 is operating and the electric motor is operating. The first heat exchanger 62 is idle, the second heat exchanger 64 removes heat from the air stream, and the third heat exchanger 66 transfers heat into the air stream. It is understood that the engine 40 may have also been previously running and has residual heat stored therein. The diverter valves 68, 70 are positioned to militate against flow of the first fluid to the first heat exchanger 62 and permit flow to the third heat exchanger 66. The pump 52 of the second circuit 14 is operating to circulate the first fluid through the second conduit 38. Heat is transferred into the first fluid by the engine 40.

The diverter valve 48 is positioned to militate against flow through the heat exchanger 42 and permit flow through the first bypass conduit 44. Thus, heat is not removed from the first fluid in the heat exchanger 42 and the first fluid flows through the first bypass conduit 44. The diverter valve 50 is in a position to militate against flow of the first fluid through the second bypass conduit 46. Therefore, the first fluid flows through the second conduit 38 to the third heat exchanger 66 where heat is transferred from the first fluid to the air flowing in the air conduit 60.

The pump 18 of the first circuit 12 is operating to circulate the first fluid through the first conduit 16 to supply the first fluid to the first TED 54. The pump 36 is not operating and the valves 32, 34 of the crossover conduits 28, 30 are closed to militate against flow therethrough. The diverter valve 26 is positioned to permit flow through the heat exchanger 20 and militate against flow to the battery compartment 22. Thus, heat is removed from the first fluid in the heat exchanger 20. The controller causes the current to the first TED 54 to flow to cause the first heat transfer surface 55 to generate heat which is absorbed by the first fluid. The first fluid then returns to the pump 18 for recirculation.

The pump 58 is operating to circulate the second fluid through the third conduit 57. The second fluid is in thermal communication with the second heat transfer surface 56 of the first TED 54. The second heat transfer surface 56 removes heat from the second fluid. Thus, the second fluid flows to the second heat exchanger 64 where heat is transferred from the air flowing in the air conduit 60 to the second fluid. Therefore, air is cooled in the second heat exchanger 64, heated by the third heat exchanger 66, and delivered to the passenger compartment of the vehicle for demisting. By initially cooling the air, moisture is caused to be removed from the air by condensation.

In a cooling mode, where the engine 40 is not operating and the electric motor is operating, the second heat exchanger 64 removes heat from the air stream, and the first heat exchanger 62 and the third heat exchanger 66 are idle. Initially, it is presumed that the engine 40 was previously running and requires cooling. The pump 52 of the second circuit 14 is operating to circulate the first fluid through the second conduit 38. Heat is transferred into the first fluid by the engine 40.

The diverter valve 48 is positioned to militate against flow through the first bypass conduit 44 and permit flow through the heat exchanger 42. Thus, heat is removed from the first fluid in the heat exchanger 42. The diverter valve 50 is in a position to permit flow of the first fluid through the second bypass conduit 46 and militate against flow through the second conduit 38 to the first heat exchanger 62 and the third heat exchanger 66. Once the engine 40 has sufficiently cooled, the pump 52 can be switched to the off position until the engine 40 requires additional cooling.

The pump 18 of the first circuit 12 is operating to circulate the first fluid through the first conduit 16 to supply the first fluid to the first TED 54. The pump 36 is not operating and the valves 32, 34 of the crossover conduits 28, 30 are closed to militate against flow therethrough. The diverter valve 26 is positioned to permit flow through the heat exchanger 20 and militate against flow to the battery compartment 22. Thus, heat is removed from the first fluid in the heat exchanger 20. The controller causes the current to the first TED 54 to flow to cause the first heat transfer surface 55 to generate heat which is absorbed by the first fluid. The first fluid then returns to the pump 18 for recirculation.

The pump 58 is operating to circulate the second fluid through the third conduit 57. The second fluid is in thermal communication with the second heat transfer surface 56 of the first TED 54. The second heat transfer surface 56 removes heat from the second fluid. Thus, the second fluid flows to the second heat exchanger 64 where heat is transferred from the air flowing in the air conduit 60 to the second fluid. Therefore, air is cooled in the second heat exchanger 64 and delivered to the passenger compartment of the vehicle.

Figure 2:
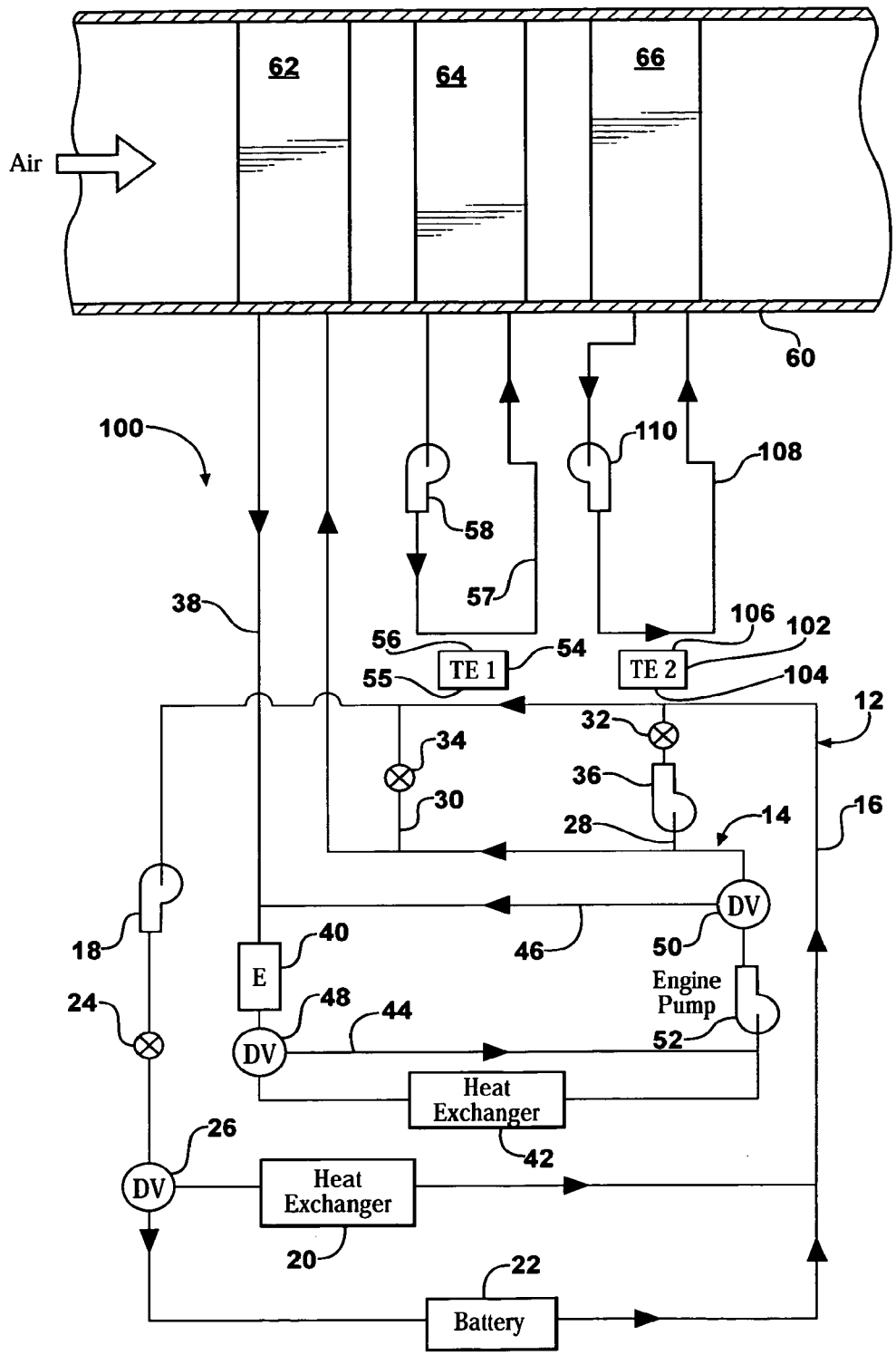
FIG. 2 is a schematic flow diagram of a HVAC system according to another embodiment of the invention.

FIG. 2 shows a heating ventilating, and air conditioning (HVAC) system 100 for supplying conditioned air to a passenger compartment of a vehicle according to another embodiment of the invention. Structure included from FIG. 1 has the same reference numeral for clarity and a description thereof is not repeated.

In the embodiment shown, a second thermoelectric device (TED) 102 is disposed adjacent the first conduit 16 and the first TED 54, and between the crossover conduits 28, 30. The second TED 102 includes a first heat transfer surface 104 and a second heat transfer surface 106. The first heat transfer surface 104 is in thermal communication with the first conduit 16 of the first circuit 12. The second TED 102 is in electrical communication with a control system (not shown). The control system controls an electric current sent to the second TED 102 in the same way as described for the first TED 54. The second thermoelectric device 102 may be any conventional device such as those listed for the first TED 54. Although a single thermoelectric device is shown, it is understood that additional thermoelectric devices can be used, as desired.

A fourth conduit 108 is in thermal communication with the second heat transfer surface 106 of the second TED 102. The fourth conduit 108 conveys a third fluid (not shown). The third fluid can be any conventional fluid such as air or a coolant such as a water-glycol coolant, for example. A pump 110 is disposed in the fourth conduit 108 to circulate the third fluid therethrough.

The first heat exchanger 62 is in fluid communication with the second circuit 14 and the third heat exchanger 66 is in fluid communication with the fourth conduit 108. The fourth conduit 108 circulates the third fluid between the second TED 102 and the third heat exchanger 66.

In operation, the system 100 conditions the air flowing from the source of air for supply of the conditioned air to the passenger compartment of the vehicle. A flow direction of the air from the source of air is indicated by the arrow in the air conduit 60. Similar to the operation described for the system 10, the system 100 can operate in a heating mode, a demisting mode, and a cooling mode.

In a first heating mode where the engine 40 is operating and the electric motor is not operating, the first heat exchanger 62, the second heat exchanger 64, and the third heat exchanger 66 transfer heat into the air stream. The pump 52 of the second circuit 14 is operating to circulate the first fluid through the second conduit 38. Heat is transferred into the first fluid by the engine 40.

The diverter valve 48 is positioned to militate against flow through the heat exchanger 42 and permit flow through the first bypass conduit 44. Thus, heat is not removed from the first fluid in the heat exchanger 42 and the first fluid flows through the first bypass conduit 44. The diverter valve 50 is in a position to militate against flow of the first fluid through the second bypass conduit 46. Therefore, the first fluid flows through the second conduit 38 to the first heat exchanger 62 where heat is transferred from the first fluid to the air flowing in the air conduit 60.

The pump 18 of the first circuit 12 is not operating to circulate the first fluid through the first conduit 16. In order to supply the first fluid to the first TED 54 and the second TED 102, the pump 36 is operating and the valves 32, 34 of the crossover conduits 28, 30 are open to permit flow therethrough. A portion of the flow of the first fluid in the second conduit 38 is directed through the crossover conduit 28 and into thermal communication with the first heat transfer surface 55 of the first TED 54 and the first heat transfer surface 104 of the second TED 102. The controller causes the current to the first TED 54 and the second TED 102 to flow to cause the first heat transfer surface 55 and the first heat transfer surface 104 to absorb heat and remove heat from the first fluid. The first fluid then flows through the crossover conduit 30 to re-enter the second conduit 38 and flow to the first heat exchanger 62.

The pump 58 is operating to circulate the second fluid through the third conduit 57. The second fluid is in thermal communication with the second heat transfer surface 56 of the first TED 54. The second heat transfer surface 56 generates heat which is transferred to the second fluid. Thus, the second fluid flows to the second heat exchanger 64 where heat is transferred from the second fluid to the air flowing in the air conduit 60.

The pump 110 is operating to circulate the third fluid through the fourth conduit 108. The third fluid is in thermal communication with the second heat transfer surface 106 of the second TED 102. The second heat transfer surface 106 generates heat which is transferred to the third fluid. Thus, the third fluid flows to the third heat exchanger 66 where heat is transferred from the third fluid to the air flowing in the air conduit 60. Therefore, heated air is delivered to the passenger compartment of the vehicle from the first heat exchanger 62, the second heat exchanger 64, and the third heat exchanger 66. It is understood that this mode can be used with the first heat exchanger 62 and the second heat exchanger 64 transferring heat into the air stream, and the third heat exchanger 66 idle. It is also understood that this mode can be used with only the first heat exchanger 62 transferring heat into the air stream, and the second heat exchanger 64 and the third heat exchanger 66 idle.

In a second heating mode where the engine 40 is operating and the electric motor is operating, the first heat exchanger 62, the second heat exchanger 64, and the third heat exchanger 66 transfer heat into the air stream. The pump 52 of the second circuit 14 is operating to circulate the first fluid through the second conduit 38. Heat is transferred into the first fluid by the engine 40.

The diverter valve 48 is positioned to militate against flow through the heat exchanger 42 and permit flow through the first bypass conduit 44. Thus, heat is not removed from the first fluid in the heat exchanger 42 and the first fluid flows through the first bypass conduit 44. The diverter valve 50 is in a position to militate against flow of the first fluid through the second bypass conduit 46. Therefore, the first fluid flows through the second conduit 38 to the first heat exchanger 62 where heat is transferred from the first fluid to the air flowing in the air conduit 60.

The pump 18 of the first circuit 12 is operating to circulate the first fluid through the first conduit 16 to supply the first fluid to the first TED 54 and the second TED 102. The pump 36 is not operating and the valves 32, 34 of the crossover conduits 28, 30 are closed to militate against flow therethrough. The first fluid flows through the battery compartment 22 where heat is transferred into the first fluid, then through the first conduit 16, and into thermal communication with the first heat transfer surface 55 of the first TED 54 and the first heat transfer surface 104 of the second TED 102. The diverter valve 26 is positioned to militate against flow through the heat exchanger 20 and permit flow to the battery compartment 22. Thus, heat is not removed from the first fluid in the heat exchanger 20. The controller causes the current to the first TED 54 and the second TED 102 to flow to cause the first heat transfer surface 55 and the first heat transfer surface 104 to absorb heat to and remove heat from the first fluid. The first fluid then returns to the pump 18 for recirculation.

The pump 58 is operating to circulate the second fluid through the third conduit 57. The second fluid is in thermal communication with the second heat transfer surface 56 of the first TED 54. The second heat transfer surface 56 generates heat which is transferred to the second fluid. Thus, the second fluid flows to the second heat exchanger 64 where heat is transferred from the second fluid to the air flowing in the air conduit 60.

The pump 110 is operating to circulate the third fluid through the fourth conduit 108. The third fluid is in thermal communication with the second heat transfer surface 106 of the second TED 102. The second heat transfer surface 106 generates heat which is transferred to the third fluid. Thus, the third fluid flows to the third heat exchanger 66 where heat is transferred from the third fluid to the air flowing in the air conduit 60. Therefore, heated air is delivered to the passenger compartment of the vehicle from the first heat exchanger 62, the second heat exchanger 64, and the third heat exchanger 66. It is understood that this mode can be used with the first heat exchanger 62 and the second heat exchanger 64 transferring heat into the air stream, and the third heat exchanger 66 idle. It is also understood that this mode can be used with only the first heat exchanger 62 transferring heat into the air stream, and the second heat exchanger 64 and the third heat exchanger 66 idle. It is understood that a third heating mode as described above for FIG. 1 can be used with the first TED 54 and the second heat exchanger 64, or the first TED 54 and the second heat exchanger 64 and the second TED 102 and the third heat exchanger 66 with the first heat exchanger 62 being idle.

In a demisting mode, the engine 40 is not operating and the electric motor is operating. The first heat exchanger 62 is idle, the second heat exchanger 64 removes heat from the air stream, and the third heat exchanger 66 transfers heat into the air stream. It is understood that the engine 40 may have also been previously running and has residual heat stored therein, and that the second circuit 14 is operated as described for FIG. 1 to remove heat from the engine 40. Additionally, it is understood that the engine 40 could be operating, and that the second circuit 14 is operated as described for FIG. 1 to remove heat from the engine 40.

The pump 18 of the first circuit 12 is operating to circulate the first fluid through the first conduit 16 to supply the first fluid to the first TED 54 and the second TED 102. The pump 36 is not operating and the valves 32, 34 of the crossover conduits 28, 30 are closed to militate against flow therethrough. The diverter valve 26 is positioned to permit flow through the heat exchanger 20 and militate against flow to the battery compartment 22. Thus, heat is removed from the first fluid in the heat exchanger 20. The controller causes the current in the second TED 102 to flow to cause the first heat transfer surface 104 to absorb heat and remove heat from the first fluid. The controller causes the current to the first TED 54 to flow to cause the first heat transfer surface 55 to generate heat which is absorbed by the first fluid. The first fluid then returns to the pump 18 for recirculation.

The pump 58 is operating to circulate the second fluid through the third conduit 57. The second fluid is in thermal communication with the second heat transfer surface 56 of the first TED 54. The second heat transfer surface 56 removes heat from the second fluid. Thus, the second fluid flows to the second heat exchanger 64 where heat is transferred from the air flowing in the air conduit 60 to the second fluid.

The pump 110 is operating to circulate the third fluid through the fourth conduit 108. The third fluid is in thermal communication with the second heat transfer surface 106 of the second TED 102. The second heat transfer surface 106 generates heat which is absorbed by the third fluid. Thus, the third fluid flows to the third heat exchanger 66 where heat is transferred to the air flowing in the air conduit 60 from the third fluid.

Therefore, air is cooled in the second heat exchanger 64, heated by the third heat exchanger 66, and delivered to the passenger compartment of the vehicle for demisting. By initially cooling the air, moisture is caused to be removed from the air by condensation.

In a cooling mode, where the engine 40 is not operating and the electric motor is operating, the second heat exchanger 64 and the third heat exchanger 66 remove heat from the air stream, and the first heat exchanger 62 is idle. It is understood that the engine 40 may have also been previously running and has residual heat stored therein, and that the second circuit 14 is operated as described for FIG. 1 to remove heat from the engine 40. Additionally, it is understood that the engine 40 could be operating, and that the second circuit 14 is operated as described for FIG. 1 to remove heat from the engine 40.

The pump 18 of the first circuit 12 is operating to circulate the first fluid through the first conduit 16 to supply the first fluid to the first TED 54 and the second TED 102. The pump 36 is not operating and the valves 32, 34 of the crossover conduits 28, 30 are closed to militate against flow therethrough. The diverter valve 26 is positioned to permit flow through the heat exchanger 20 and militate against flow to the battery compartment 22. Thus, heat is removed from the first fluid in the heat exchanger 20. The controller causes the current to the first TED 54 and the second TED 102 to flow to cause the first heat transfer surface 55 and the first heat transfer surface 104 to generate heat which is absorbed by the first fluid. The first fluid then returns to the pump 18 for recirculation.

The pump 58 is operating to circulate the second fluid through the third conduit 57. The second fluid is in thermal communication with the second heat transfer surface 56 of the first TED 54. The second heat transfer surface 56 removes heat from the first fluid. Thus, the second fluid flows to the second heat exchanger 64 where heat is transferred from the air flowing in the air conduit 60 to the second fluid.

The pump 110 is operating to circulate the third fluid through the fourth conduit 108. The third fluid is in thermal communication with the second heat transfer surface 106 of the second TED 102. The second heat transfer surface 106 removes heat from the third fluid. Thus, the third fluid flows to the third heat exchanger 66 where heat is transferred from the air flowing in the air conduit 60 to the third fluid. Therefore, air is cooled in the second heat exchanger 64 and the third heat exchanger 66, and delivered to the passenger compartment of the vehicle. It is understood that this mode can be used with one of the second heat exchanger 64 and the third heat exchanger 66 transferring heat from the air stream, and the other of the second heat exchanger 64 and the third heat exchanger 66 idle.

Figure 3:
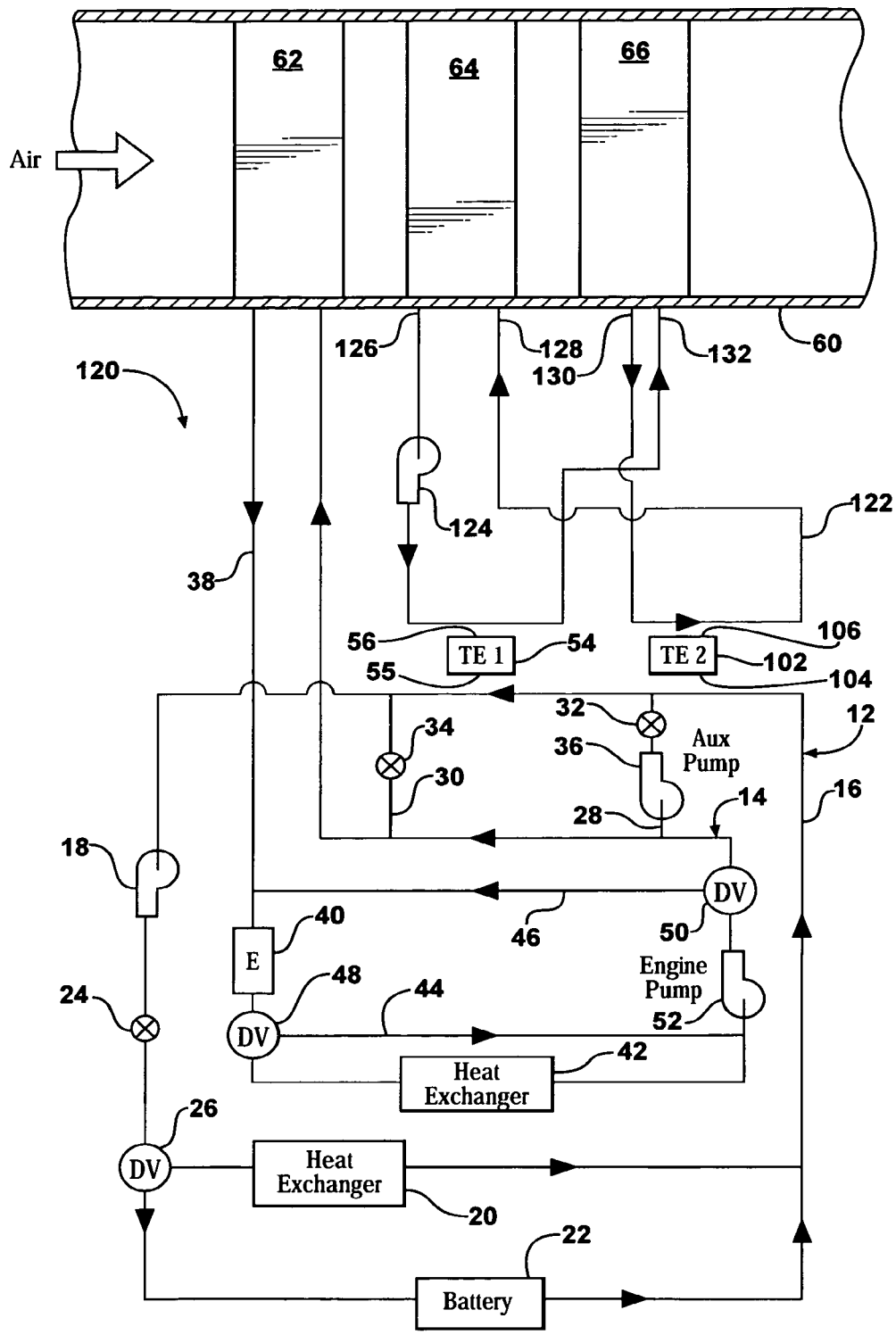
FIG. 3 is a schematic flow diagram of a HVAC system according to another embodiment of the invention.

FIG. 3 shows a heating ventilating, and air conditioning (HVAC) system 120 for supplying conditioned air to a passenger compartment of a vehicle according to another embodiment of the invention. Structure included from FIGS. 1 and 2 has the same reference numeral for clarity and a description thereof is not repeated.

In the embodiment shown, the first TED 54 and the second TED 102 include a third conduit 122 in thermal communication with both the second heat transfer surface 56 of the first TED 54 and the second heat transfer surface 106 of the second TED 102. The third conduit 122 conveys a second fluid (not shown). The second fluid can be any conventional fluid such as air or a coolant such as a water-glycol coolant, for example. A pump 124 is disposed in the third conduit 122 to circulate the second fluid therethrough.

The first heat exchanger 62 is in fluid communication with the second circuit 14. The second heat exchanger 64 has an outlet 126 in fluid communication with the first TED 54 and an inlet 128 in fluid communication with the second TED 102. The third heat exchanger 66 has an outlet 130 in fluid communication with the second TED 102 and an inlet 132 in fluid communication with the first TED 54. The third conduit 122 circulates the second fluid between the first TED 54, the third heat exchanger 66, the second TED 102 and the second heat exchanger 64.

In operation, the system 120 conditions the air flowing from the source of air for supply of the conditioned air to the passenger compartment of the vehicle. A flow direction of the air from the source of air is indicated by the arrow in the air conduit 60. Similar to the operation described for the systems 10, 100, the system 120 can operate in a heating mode, a demisting mode, and a cooling mode.

In a first heating mode where the engine 40 is operating and the electric motor is not operating, the first heat exchanger 62, the second heat exchanger 64, and the third heat exchanger 66 transfer heat into the air stream. The pump 52 of the second circuit 14 is operating to circulate the first fluid through the second conduit 38. Heat is transferred into the first fluid by the engine 40.

The diverter valve 48 is positioned to militate against flow through the heat exchanger 42 and permit flow through the first bypass conduit 44. Thus, heat is not removed from the first fluid in the heat exchanger 42 and the first fluid flows through the first bypass conduit 44. The diverter valve 50 is in a position to militate against flow of the first fluid through the second bypass conduit 46. Therefore, the first fluid flows through the second conduit 38 to the first heat exchanger 62 where heat is transferred from the first fluid to the air flowing in the air conduit 60.

The pump 18 of the first circuit 12 is not operating to circulate the first fluid through the first conduit 16. In order to supply the first fluid to the first TED 54 and the second TED 102, the pump 36 is operating and the valves 32, 34 of the crossover conduits 28, 30 are open to permit flow therethrough. A portion of the flow of the first fluid in the second conduit 38 is directed through the crossover conduit 28 and into thermal communication with the first heat transfer surface 55 of the first TED 54 and the first heat transfer surface 104 of the second TED 102. The controller causes the current to the first TED 54 and the second TED 102 to flow to cause the first heat transfer surface 55 and the first heat transfer surface 104 to absorb heat and remove heat from the first fluid. The first fluid then flows through the crossover conduit 30 to re-enter the second conduit 38 and flow to the first heat exchanger 62.

The pump 124 is operating to circulate the second fluid through the third conduit 122. The second fluid is in thermal communication with the second heat transfer surface 56 of the first TED 54 and the second heat transfer surface 106 of the second TED 102. The second heat transfer surface 56 and the second heat transfer surface 106 generate heat which is transferred to the second fluid. Thus, the second fluid flows to the second heat exchanger 64 and the third heat exchanger 66 where heat is transferred from the second fluid to the air flowing in the air conduit 60. Therefore, heated air is delivered to the passenger compartment of the vehicle from the first heat exchanger 62, the second heat exchanger 64, and the third heat exchanger 66. It is understood that this mode can be used with only the first heat exchanger 62 transferring heat into the air stream, and the second heat exchanger 64 and the third heat exchanger 66 idle.

In a second heating mode where the engine 40 is operating and the electric motor is operating, the first heat exchanger 62, the second heat exchanger 64, and the third heat exchanger 66 transfer heat into the air stream. The pump 52 of the second circuit 14 is operating to circulate the first fluid through the second conduit 38. Heat is transferred into the first fluid by the engine 40.

The diverter valve 48 is positioned to militate against flow through the heat exchanger 42 and permit flow through the first bypass conduit 44. Thus, heat is not removed from the first fluid in the heat exchanger 42 and the first fluid flows through the first bypass conduit 44. The diverter valve 50 is in a position to militate against flow of the first fluid through the second bypass conduit 46. Therefore, the first fluid flows through the second conduit 38 to the first heat exchanger 62 where heat is transferred from the first fluid to the air flowing in the air conduit 60.

The pump 18 of the first circuit 12 is operating to circulate the first fluid through the first conduit 16 to supply the first fluid to the first TED 54 and the second TED 102. The pump 36 is not operating and the valves 32, 34 of the crossover conduits 28, 30 are closed to militate against flow therethrough. The first fluid flows through the battery compartment 22 where heat is transferred into the first fluid, flows through the first conduit 16, and into thermal communication with the first heat transfer surface 55 of the first TED 54 and the first heat transfer surface 104 of the second TED 102. The diverter valve 26 is positioned to militate against flow through the heat exchanger 20 and permit flow to the battery compartment 22. Thus, heat is not removed from the first fluid in the heat exchanger 20. The controller causes the current to the first TED 54 and the second TED 102 to flow to cause the first heat transfer surface 55 and the first heat transfer surface 104 to absorb heat to and remove heat from the first fluid. The first fluid then returns to the pump 18 for recirculation.

The pump 124 is operating to circulate the second fluid through the third conduit 122. The second fluid is in thermal communication with the second heat transfer surface 56 of the first TED 54 and the second heat transfer surface 106 of the second TED 102. The second heat transfer surface 56 and the second heat transfer surface 106 generate heat which is transferred to the second fluid. Thus, the second fluid flows to the second heat exchanger 64 and the third heat exchanger 66 where heat is transferred from the second fluid to the air flowing in the air conduit 60.

Therefore, heated air is delivered to the passenger compartment of the vehicle from the first heat exchanger 62, the second heat exchanger 64, and the third heat exchanger 66. It is understood that this mode can be used with only the first heat exchanger 62 transferring heat into the air stream, and the second heat exchanger 64 and the third heat exchanger 66 idle. It is understood that a third heating mode as described above for FIG. 1 can be used with the first TED 54, the second TED 102, the second heat exchanger 64, and the third heat exchanger 66 with the first heat exchanger 62 being idle.

In a demisting mode, the engine 40 is not operating and the electric motor is operating. The first heat exchanger 62 is idle, the second heat exchanger 64 removes heat from the air stream, and the third heat exchanger 66 transfers heat into the air stream. It is understood that the engine 40 may have also been previously running and has residual heat stored therein, and that the second circuit 14 is operated as described for FIG. 1 to remove heat from the engine 40. Additionally, it is understood that the engine 40 could be operating, and that the second circuit 14 is operated as described for FIG. 1 to remove heat from the engine 40.

The pump 18 of the first circuit 12 is operating to circulate the first fluid through the first conduit 16 to supply the first fluid to the first TED 54 and the second TED 102. The pump 36 is not operating and the valves 32, 34 of the crossover conduits 28, 30 are closed to militate against flow therethrough. The diverter valve 26 is positioned to permit flow through the heat exchanger 20 and militate against flow to the battery compartment 22. Thus, heat is removed from the first fluid in the heat exchanger 20. The controller causes the current in the second TED 102 to flow to cause the first heat transfer surface 104 to generate heat which is absorbed by the first fluid. The controller causes the current to the first TED 54 to flow to cause the first heat transfer surface 55 to absorb heat which removes heat from the first fluid. The first fluid then returns to the pump 18 for recirculation.

The pump 124 is operating to circulate the second fluid through the third conduit 122. The second fluid is in thermal communication with the second heat transfer surface 56 of the first TED 54. The second heat transfer surface 56 generates heat which is transferred to the second fluid. The second fluid flows to the third heat exchanger 66 where heat is transferred to the air flowing in the air conduit 60 to the second fluid. The second fluid flows to the second heat transfer surface 106 and is in thermal communication with the second heat transfer surface 106. The second heat transfer surface 106 absorbs heat and removes heat from the second fluid. The second fluid flows to the second heat exchanger 64 where heat is removed from the air flowing in the air conduit 60 to the second fluid.

Therefore, air is cooled in the second heat exchanger 64, heated by the third heat exchanger 66, and delivered to the passenger compartment of the vehicle for demisting. By initially cooling the air, moisture is caused to be removed from the air by condensation.

In a cooling mode, where the engine 40 is not operating and the electric motor is operating, the second heat exchanger 64 and the third heat exchanger 66 remove heat from the air stream, and the first heat exchanger 62 is idle. It is understood that the engine 40 may have also been previously running and has residual heat stored therein, and that the second circuit 14 is operated as described for FIG. 1 to remove heat from the engine 40. Additionally, it is understood that the engine 40 could be operating, and that the second circuit 14 is operated as described for FIG. 1 to remove heat from the engine 40.

The pump 18 of the first circuit 12 is operating to circulate the first fluid through the first conduit 16 to supply the first fluid to the first TED 54 and the second TED 102. The pump 36 is not operating and the valves 32, 34 of the crossover conduits 28, 30 are closed to militate against flow therethrough. The diverter valve 26 is positioned to permit flow through the heat exchanger 20 and militate against flow to the battery compartment 22. Thus, heat is removed from the first fluid in the heat exchanger 20. The controller causes the current to the first TED 54 and the second TED 102 to flow to cause the first heat transfer surface 55 and the first heat transfer surface 104 to generate heat which is absorbed by the first fluid. The first fluid then returns to the pump 18 for recirculation.

The pump 124 is operating to circulate the second fluid through the third conduit 122. The second fluid is in thermal communication with the second heat transfer surface 56 of the first TED 54 and the second heat transfer surface 106 of the second TED 102. The second heat transfer surface 56 and the second heat transfer surface 106 remove heat from the first fluid. Thus, the second fluid flows to the second heat exchanger 64 and the third heat exchanger 66 where heat is transferred from the air flowing in the air conduit 60 to the second fluid. Therefore, air is cooled in the second heat exchanger 64 and the third heat exchanger 66, and delivered to the passenger compartment of the vehicle.

Figure 4:
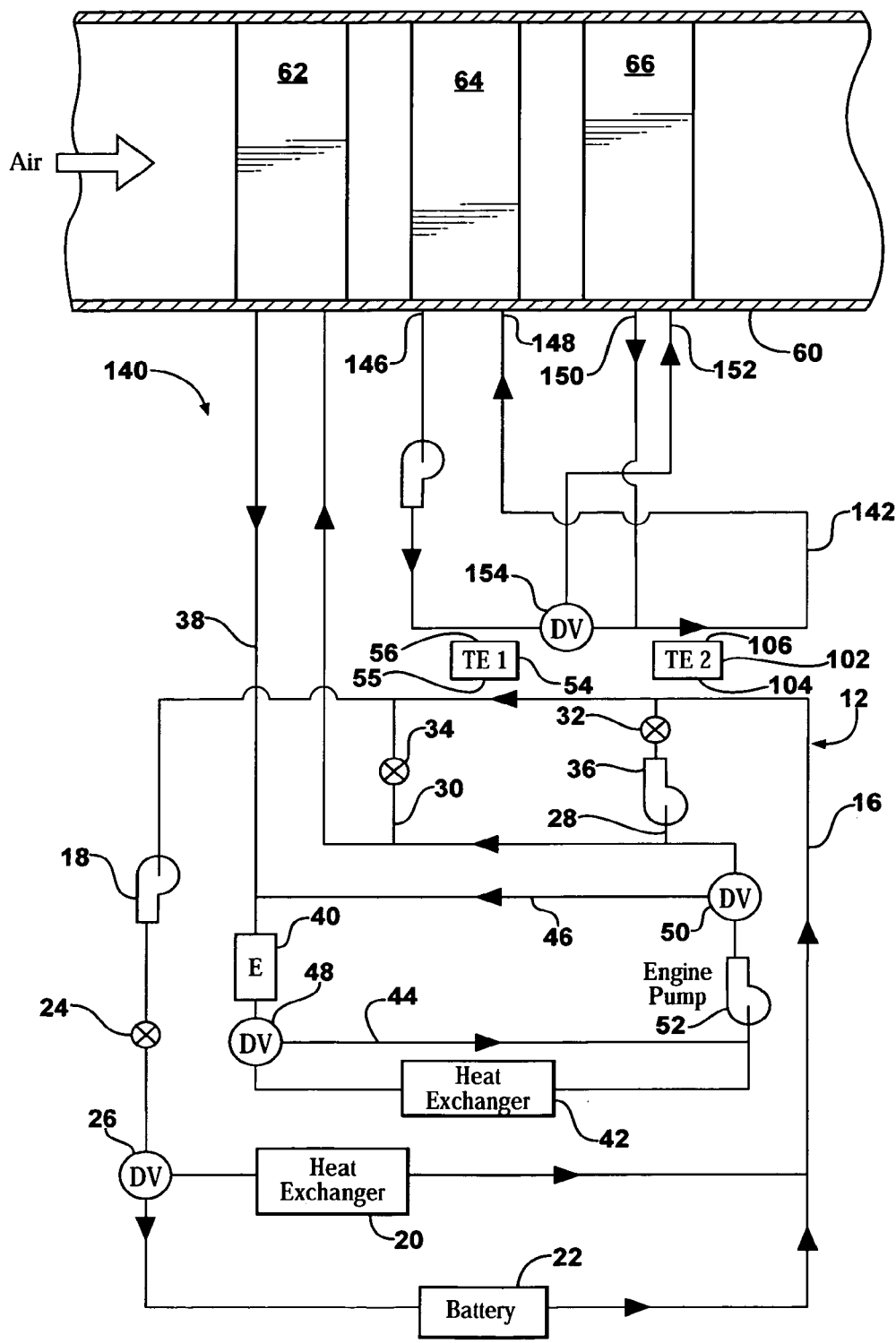
FIG. 4 is a schematic flow diagram of a HVAC system according to another embodiment of the invention.

FIG. 4 shows a heating ventilating, and air conditioning (HVAC) system 140 for supplying conditioned air to a passenger compartment of a vehicle according to another embodiment of the invention. Structure included from FIGS. 1 and 2 has the same reference numeral for clarity and a description thereof is not repeated.

In the embodiment shown, the first TED 54 and the second TED 102 include a third conduit 142 in thermal communication with both the second heat transfer surface 56 of the first TED 54 and the second heat transfer surface 106 of the second TED 102. The third conduit 142 conveys a second fluid (not shown). The second fluid can be any conventional fluid such as air or a coolant such as a water-glycol coolant, for example. A pump 144 is disposed in the third conduit 142 to circulate the second fluid therethrough.

The first heat exchanger 62 is in fluid communication with the second circuit 14. The second heat exchanger 64 has an outlet 146 in fluid communication with the first TED 54 and an inlet 148 in fluid communication with the second TED 102. The third heat exchanger 66 has an outlet 150 in fluid communication with the second TED 102 and an inlet 152 in fluid communication with the first TED 54. The third conduit 142 circulates the second fluid between the first TED 54, the third heat exchanger 66, the second TED 102 and the second heat exchanger 64. However, a diverter valve 154 is disposed in the third conduit 142 to selectively control flow of the second fluid from the first TED 54. In a first position, the diverter valve 154 directs flow as described for FIG. 3. In a second position, the diverter valve 154 directs flow from the first TED 54, to the second TED 102, and back to the second heat exchanger 64. Therefore, the third heat exchanger 66 is bypassed and the flow is similar to the flow of the second fluid described for FIG. 1.

In operation, the system 140 conditions the air flowing from the source of air for supply of the conditioned air to the passenger compartment of the vehicle. A flow direction of the air from the source of air is indicated by the arrow in the air conduit 60. Similar to the operation described for the systems 10, 100, 120 the system 140 can operate in a heating mode, a demisting mode, and a cooling mode.

In a first heating mode where the engine 40 is operating and the electric motor is not operating, the first heat exchanger 62 and the second heat exchanger 64, transfer heat into the air stream. The third heat exchanger 66 is idle. The pump 52 of the second circuit 14 is operating to circulate the first fluid through the second conduit 38. Heat is transferred into the first fluid by the engine 40.

The diverter valve 48 is positioned to militate against flow through the heat exchanger 42 and permit flow through the first bypass conduit 44. Thus, heat is not removed from the first fluid in the heat exchanger 42 and the first fluid flows through the first bypass conduit 44. The diverter valve 50 is in a position to militate against flow of the first fluid through the second bypass conduit 46. Therefore, the first fluid flows through the second conduit 38 to the first heat exchanger 62 where heat is transferred from the first fluid to the air flowing in the air conduit 60.

The pump 18 of the first circuit 12 is not operating to circulate the first fluid through the first conduit 16. In order to supply the first fluid to the first TED 54 and the second TED 102, the pump 36 is operating and the valves 32, 34 of the crossover conduits 28, 30 are open to permit flow therethrough. A portion of the flow of the first fluid in the second conduit 38 is directed through the crossover conduit 28 and into thermal communication with the first heat transfer surface 55 of the first TED 54 and the first heat transfer surface 104 of the second TED 102. The controller causes the current to the first TED 54 and the second TED 102 to flow to cause the first heat transfer surface 55 and the first heat transfer surface 104 to absorb heat and remove heat from the first fluid. The first fluid then flows through the crossover conduit 30 to re-enter the second conduit 38 and flow to the first heat exchanger 62.

The pump 144 is operating to circulate the second fluid through the third conduit 142 and bypassing the third heat exchanger 66. The diverter valve 154 is in a position to militate against flow of the second fluid to the third heat exchanger 66. The second fluid is in thermal communication with the second heat transfer surface 56 of the first TED 54 and the second heat transfer surface 106 of the second TED 102. The second heat transfer surface 56 and the second heat transfer surface 106 generate heat which is transferred to the second fluid. Thus, the second fluid flows to the second heat exchanger 64 where heat is transferred from the second fluid to the air flowing in the air conduit 60. Therefore, heated air is delivered to the passenger compartment of the vehicle from the first heat exchanger 62 and the second heat exchanger 64. It is understood that this mode can be used with only the first heat exchanger 62 transferring heat into the air stream, and the second heat exchanger 64 and the third heat exchanger 66 idle. It is further understood that this mode can be used as described above for FIG. 3 to transfer heat into the air stream using the first heat exchanger 62, the second heat exchanger 64 and the third heat exchanger 66.

In a second heating mode where the engine 40 is operating and the electric motor is operating, the first heat exchanger 62 and the second heat exchanger 64 transfer heat into the air stream. The pump 52 of the second circuit 14 is operating to circulate the first fluid through the second conduit 38. Heat is transferred into the first fluid by the engine 40.

The diverter valve 48 is positioned to militate against flow through the heat exchanger 42 and permit flow through the first bypass conduit 44. Thus, heat is not removed from the first fluid in the heat exchanger 42 and the first fluid flows through the first bypass conduit 44. The diverter valve 50 is in a position to militate against flow of the first fluid through the second bypass conduit 46. Therefore, the first fluid flows through the second conduit 38 to the first heat exchanger 62 where heat is transferred from the first fluid to the air flowing in the air conduit 60.

The pump 18 of the first circuit 12 is operating to circulate the first fluid through the first conduit 16 to supply the first fluid to the first TED 54 and the second TED 102. The pump 36 is not operating and the valves 32, 34 of the crossover conduits 28, 30 are closed to militate against flow therethrough. The first fluid flows through the battery compartment 22 where heat is transferred into the first fluid, flows through the first conduit 16, and into thermal communication with the first heat transfer surface 55 of the first TED 54 and the first heat transfer surface 104 of the second TED 102. The diverter valve 26 is positioned to militate against flow through the heat exchanger 20 and permit flow to the battery compartment 22. Thus, heat is not removed from the first fluid in the heat exchanger 20. The controller causes the current to the first TED 54 and the second TED 102 to flow to cause the first heat transfer surface 55 and the first heat transfer surface 104 to absorb heat to and remove heat from the first fluid. The first fluid then returns to the pump 18 for recirculation.

The pump 144 is operating to circulate the second fluid through the third conduit 142 and bypassing the third heat exchanger 66. The diverter valve 154 is in a position to militate against flow of the second fluid to the third heat exchanger 66. The second fluid is in thermal communication with the second heat transfer surface 56 of the first TED 54 and the second heat transfer surface 106 of the second TED 102. The second heat transfer surface 56 and the second heat transfer surface 106 generate heat which is transferred to the second fluid. Thus, the second fluid flows to the second heat exchanger 64 where heat is transferred from the second fluid to the air flowing in the air conduit 60. Therefore, heated air is delivered to the passenger compartment of the vehicle from the first heat exchanger 62 and the second heat exchanger 64. It is understood that this mode can be used with only the first heat exchanger 62 transferring heat into the air stream, and the second heat exchanger 64 and the third heat exchanger 66 idle. It is further understood that this mode can be used as described above for FIG. 3 to transfer heat into the air stream using the first heat exchanger 62, the second heat exchanger 64 and the third heat exchanger 66.

In a demisting mode, the system 140 is used as described above for FIG. 3

In a cooling mode, where the engine 40 is not operating and the electric motor is operating, the second heat exchanger 64 removes heat from the air stream, and the first heat exchanger 62 and the third heat exchanger 66 are idle. It is understood that the engine 40 may have also been previously running and has residual heat stored therein, and that the second circuit 14 is operated as described for FIG. 1 to remove heat from the engine 40. Additionally, it is understood that the engine 40 could be operating, and that the second circuit 14 is operated as described for FIG. 1 to remove heat from the engine 40.

The pump 18 of the first circuit 12 is operating to circulate the first fluid through the first conduit 16 to supply the first fluid to the first TED 54 and the second TED 102. The pump 36 is not operating and the valves 32, 34 of the crossover conduits 28, 30 are closed to militate against flow therethrough. The diverter valve 26 is positioned to permit flow through the heat exchanger 20 and militate against flow to the battery compartment 22. Thus, heat is removed from the first fluid in the heat exchanger 20. The controller causes the current to the first TED 54 and the second TED 102 to flow to cause the first heat transfer surface 55 and the first heat transfer surface 104 to generate heat which is absorbed by the first fluid. The first fluid then returns to the pump 18 for recirculation.

The pump 144 is operating to circulate the second fluid through the third conduit 142 and bypassing the third heat exchanger 66. The diverter valve 154 is in a position to militate against flow of the second fluid to the third heat exchanger 66. The second fluid is in thermal communication with the second heat transfer surface 56 of the first TED 54 and the second heat transfer surface 106 of the second TED 102. The second heat transfer surface 56 and the second heat transfer surface 106 remove heat from the first fluid. Thus, the second fluid flows to the second heat exchanger 64 where heat is transferred from the air flowing in the air conduit 60 to the second fluid. Thus, the second fluid flows to the second heat exchanger 64 where heat is transferred from the second fluid to the air flowing in the air conduit 60. Therefore, air is cooled in the second heat exchanger 64 and delivered to the passenger compartment of the vehicle. It is understood that this mode can be used as described above for FIG. 3 to transfer heat from the air stream using the second heat exchanger 64 and the third heat exchanger 66.

Figure 5:
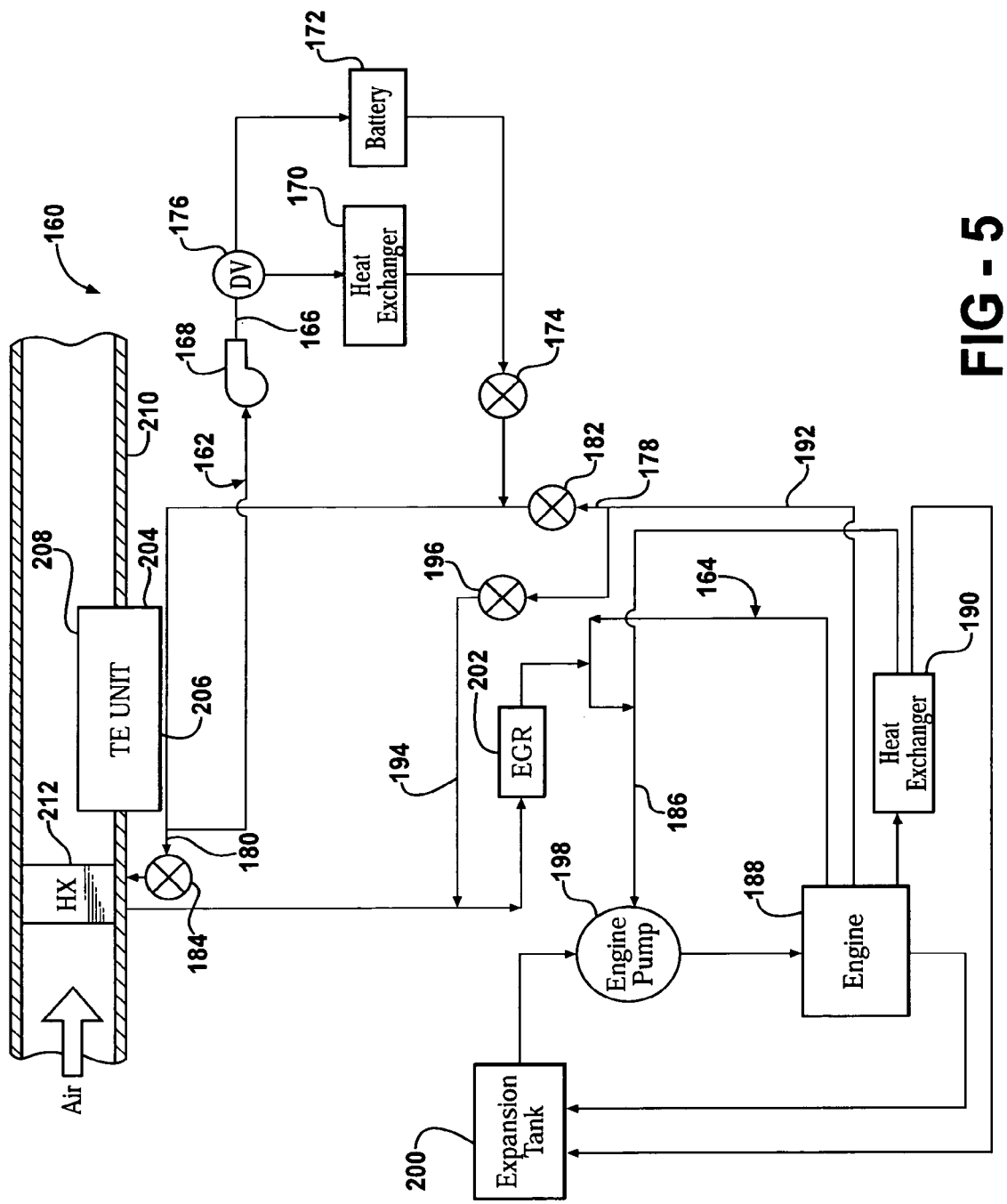
FIG. 5 is a schematic flow diagram of a HVAC system according to another embodiment of the invention.

FIG. 5 shows a heating ventilating, and air conditioning (HVAC) system 160 for supplying conditioned air to a passenger compartment of a vehicle according to another embodiment of the invention. The system 160 includes a first fluid circuit 162 and a second fluid circuit 164. In the embodiment shown, the first circuit 162 communicates with components of an electric side of a hybrid vehicle (not shown) and the second circuit 164 communicates with components of a fuel fed side of the hybrid vehicle. A first fluid (not shown) is circulated in the first circuit 162 and the second circuit 164 and can be any conventional fluid such as air or a coolant such as a water-glycol coolant, for example.

The first circuit 162 includes a first conduit 166 for conveying the first fluid through the first circuit 162. A pump 168 is disposed in the first conduit 166 to circulate the first fluid therethrough. The first conduit 166 includes a heat exchanger 170 disposed therein. The heat exchanger 170 can be any conventional heat exchanger such as a low temperature core, for example. The first fluid is also circulated through a battery compartment or other source of heat 172 from the electric side of the hybrid vehicle to remove heat therefrom. In the embodiment shown, the battery compartment 172 is disposed in parallel with the heat exchanger 170. However, it is understood that other configurations can be used as desired such as in series or a separate conduit, for example. A flow valve 174 and a diverter valve 176 are also disposed in the first conduit 166. It is understood that more or fewer valves may be used as desired to control flow of the first fluid through the first conduit 166.

Crossover conduits 178, 180 are provided between the first circuit 162 and the second circuit 164. Flow valves 182, 184 are provided in respective crossover conduits 178, 180 to selectively permit flow of the first fluid therethrough.

A second conduit 186 is included in the second circuit 164. The second conduit 186 is in fluid communication with an engine 188 of the hybrid vehicle to circulate the first fluid therethrough and remove heat therefrom. A heat exchanger 190 is disposed in the second conduit 186 downstream of the engine 188. The heat exchanger 190 can be any conventional heat exchanger such as a radiator for the vehicle, for example. A first bypass conduit 192 is provided to permit bypassing of the heat exchanger 190 and a second bypass conduit 194 is provided to create a recirculation circuit. Flow through the second bypass conduit 194 is controlled by a flow valve 196. It is understood that more or fewer valves may be used as desired to control flow of the first fluid through the second conduit 186. A pump 198 is disposed in the second conduit 186 to circulate the first fluid therethrough. An expansion tank 200 is provided to account for expansion of the first fluid during operation of the system 160. An exhaust gas heat recovery device 202 is provided to permit heat recovery from exhaust gases.

A first thermoelectric device (TED) 204 is disposed adjacent the first conduit 166. The first TED 204 includes a first heat transfer surface 206 and a second heat transfer surface 208. The first heat transfer surface 206 is in thermal communication with the first conduit 166 of the first circuit 162. The first TED 204 is in electrical communication with a control system (not shown). The control system controls an electric current sent to the first TED 204. When the current is delivered in one direction, one of the first heat transfer surface 206 and the second heat transfer surface 208 generates thermal energy or heat, and the other of the first heat transfer surface 206 and the second heat transfer surface 208 absorbs thermal energy or heat. When the current is reversed, the one of the first heat transfer surface 206 and the second heat transfer surface 208 which was generating heat now absorbs heat and the other of the first heat transfer surface 206 and the second heat transfer surface 208 now generates heat. Additionally, when the current is increased, a heating and cooling capacity of the TED is increased. Likewise, when the current is decreased, the heating and cooling capacity of the TED is decreased. Although a single thermoelectric device is shown, it is understood that additional thermoelectric devices can be used, as desired.

An air conduit 210 in fluid communication with a source of air (not shown) is provided to supply the conditioned air to the passenger compartment of the vehicle. The air conduit 210 includes a first heat exchanger 212 disposed therein. The heat exchanger 212 can be any conventional type of heat exchanger. The air conduit 210 is in thermal communication with the second heat transfer surface 208 of the first TED 204.

In operation, the system 160 conditions the air flowing from the source of air for supply of the conditioned air to the passenger compartment of the vehicle. A flow direction of the air from the source of air is indicated by the arrow in the air conduit 210. The system 160 can operate in a heating mode and a cooling mode. Additionally, if a second TED is added as discussed for FIGS. 2-4, or if the first TED 204 is disposed upstream of the first heat exchanger 190, the system 160 can operate in a demisting mode.

In a first heating mode where the engine 188 is operating and the electric motor is not operating, the first heat exchanger 212 and the first TED 204 transfer heat into the air stream. The pump 168 of the first circuit 162 is not operating to circulate the first fluid through the first conduit 166. The pump 198 of the second circuit 164 is operating to circulate the first fluid through the second conduit 186. A portion of the flow of the first fluid may be permitted to flow through the heat exchanger 190, or if additional valves are use, flow through the heat exchanger 190 can be militated against. Heat is transferred into the first fluid by the engine 188.

The valve 182 is positioned to permit flow of the first fluid from the engine 188 into thermal communication with the first heat transfer surface 206 of the first TED 204. The controller causes the current to the first TED 204 to flow to cause the first heat transfer surface 206 to absorb heat and remove some heat from the first fluid. The first fluid then flows to the first heat exchanger 212. The air flowing in the air conduit 210 is in thermal communication with the second heat transfer surface 208 of the first TED 204. The second heat transfer surface 208 generates heat which is transferred to the air flowing in the air conduit 210.

The valve 184 is positioned to permit flow through the first heat exchanger 212. In the first fluid flowing through the first heat exchanger 212, heat is removed therefrom and transferred to the air flowing in the air conduit 210. Therefore, heated air is delivered to the passenger compartment of the vehicle from the first heat exchanger 212 and the first TED 204.

In a second heating mode, where the engine 188 is not operating and the electric motor is operating, the first TED 204 transfers heat into the air stream. The pump 168 of the first circuit 162 is operating to circulate the first fluid through the first conduit 166. The diverter valve 176 is positioned to militate against flow of the first fluid to the heat exchanger 170 and permit flow to the battery compartment 172. Heat is transferred into the first fluid by the battery compartment 172. The pump 198 of the second circuit 164 is not operating to circulate the first fluid through the second conduit 186. It is understood that if the engine 188 is operating, or if there is residual heat in the engine 188 requiring removal, the pump 198 can be operated to cause the first fluid to flow through the heat exchanger 190 and recirculate back to the pump 198. If this is necessary, the valve 196 is positioned to permit flow therethrough to recirculate the flow of the first fluid back to the pump 198.

The valve 182 is positioned to militate against flow of the first fluid from the engine 188 into thermal communication with the first heat transfer surface 206 of the first TED 204. The valve 184 is positioned to militate against flow through the first heat exchanger 212.

The valve 174 is positioned to permit flow of the first fluid from the battery compartment 172 to the first heat transfer surface 206 of the first TED 204. The controller causes the current to the first TED 204 to flow to cause the first heat transfer surface 206 to absorb heat and remove heat from the first fluid. The first fluid then flows back to the pump 168 for recirculation. The air flowing in the air conduit 210 is in thermal communication with the second heat transfer surface 208 of the first TED 204. The second heat transfer surface 208 generates heat which is transferred to the air flowing in the air conduit 210. Therefore, heated air is delivered to the passenger compartment of the vehicle from the first TED 204.

In a cooling mode, where the engine 188 is not operating and the electric motor is operating, the first TED 204 removes heat from the air stream. The pump 168 of the first circuit 162 is operating to circulate the first fluid through the first conduit 166. The diverter valve 176 is positioned to militate against flow of the first fluid to the battery compartment 172 and permit flow to the heat exchanger 170. Heat is removed from the first fluid by the heat exchanger 170. The pump 198 of the second circuit 164 is not operating to circulate the first fluid through the second conduit 186. It is understood that if the engine 188 is operating, or if there is residual heat in the engine 188 requiring removal, the pump 198 can be operated to cause the first fluid to flow through the heat exchanger 190 and recirculate back to the pump 198. If this is necessary, the valve 196 is positioned to permit flow therethrough to recirculate the flow of the first fluid back to the pump 198.

The valve 182 is positioned to militate against flow of the first fluid from the engine 188 into thermal communication with the first heat transfer surface 206 of the first TED 204. The valve 184 is positioned to militate against flow through the first heat exchanger 212.

The valve 174 is positioned to permit flow of the first fluid from the heat exchanger 170 to the first heat transfer surface 206 of the first TED 204. The controller causes the current to the first TED 204 to flow to cause the first heat transfer surface 206 to generate heat which is absorbed by the first fluid. The first fluid then flows back to the pump 168 for recirculation. The air flowing in the air conduit 210 is in thermal communication with the second heat transfer surface 208 of the first TED 204. The second heat transfer surface 208 absorbs heat from the air flowing in the air conduit 210. Therefore, cooled air is delivered to the passenger compartment of the vehicle from the first TED 204.

Figure 6:
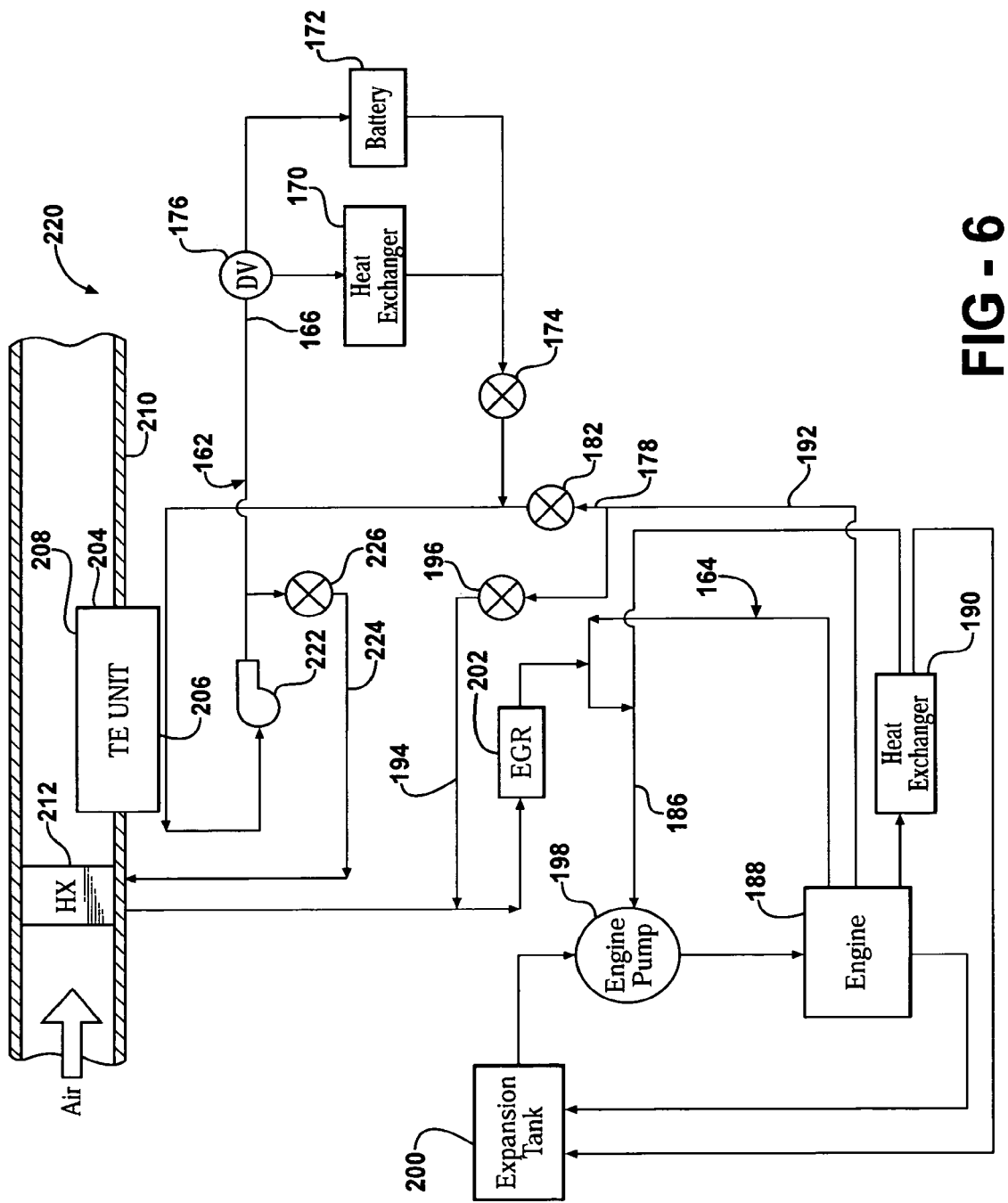
FIG. 6 is a schematic flow diagram of a HVAC system according to another embodiment of the invention.

FIG. 6 shows a heating ventilating, and air conditioning (HVAC) system 220 for supplying conditioned air to a passenger compartment of a vehicle according to another embodiment of the invention. Structure included from FIG. 5 has the same reference numeral for clarity and a description thereof is not repeated.

In the embodiment shown, a pump 222 is provided to selectively circulate the first fluid through the first conduit 166 and a crossover conduit 224. A flow valve 226 is disposed in the crossover conduit 224 to selectively permit flow of the first fluid therethrough. It is understood that more or fewer valves may be used as desired.

In operation, the system 220 conditions the air flowing from the source of air for supply of the conditioned air to the passenger compartment of the vehicle. A flow direction of the air from the source of air is indicated by the arrow in the air conduit 210. The system 220 can operate in a heating mode and a cooling mode. Additionally, if a second TED is added as discussed for FIGS. 2-4, or if the first TED 204 is disposed upstream of the first heat exchanger 190, the system 220 can operate in a demisting mode.

In a first heating mode where the engine 188 is operating and the electric motor is not operating, the first heat exchanger 212 and the first TED 204 transfer heat into the air stream. The pump 222 is operating to circulate the first fluid through the crossover conduit 224. The pump 198 of the second circuit 164 is operating to circulate the first fluid through the second conduit 186. A portion of the flow of the first fluid may be permitted to flow through the heat exchanger 190, or if additional valves are use, flow through the heat exchanger 190 can be militated against. Heat is transferred into the first fluid by the engine 188.

The valve 182 is positioned to permit flow of the first fluid from the engine 188 into thermal communication with the first heat transfer surface 206 of the first TED 204. The controller causes the current to the first TED 204 to flow to cause the first heat transfer surface 206 to absorb heat and remove some heat from the first fluid. The first fluid then flows through to the pump 222. The air flowing in the air conduit 210 is in thermal communication with the second heat transfer surface 208 of the first TED 204. The second heat transfer surface 208 generates heat which is transferred to the air flowing in the air conduit 210.

The valve 226 is positioned to permit flow through the first heat exchanger 212. In the first fluid flowing through the first heat exchanger 212, heat is removed therefrom and transferred to the air flowing in the air conduit 210. Therefore, heated air is delivered to the passenger compartment of the vehicle from the first heat exchanger 212 and the first TED 204.

In a second heating mode, where the engine 188 is not operating and the electric motor is operating, the first TED 204 transfers heat into the air stream. The pump 222 is operating to circulate the first fluid through the first conduit 166. The diverter valve 176 is positioned to militate against flow of the first fluid to the heat exchanger 170 and permit flow to the battery compartment 172. Heat is transferred into the first fluid by the battery compartment 172. The pump 198 of the second circuit 164 is not operating to circulate the first fluid through the second conduit 186. It is understood that if the engine 188 is operating, or if there is residual heat in the engine 188 requiring removal, the pump 198 can be operated to cause the first fluid to flow through the heat exchanger 190 and recirculate back to the pump 198. If this is necessary, the valve 196 is positioned to permit flow therethrough to recirculate the flow of the first fluid back to the pump 198.

The valve 182 is positioned to militate against flow of the first fluid from the engine 188 into thermal communication with the first heat transfer surface 206 of the first TED 204. The valve 226 is positioned to militate against flow through the first heat exchanger 212.

The valve 174 is positioned to permit flow of the first fluid from the battery compartment 172 to the first heat transfer surface 206 of the first TED 204. The controller causes the current to the first TED 204 to flow to cause the first heat transfer surface 206 to absorb heat and remove heat from the first fluid. The first fluid then flows back to the pump 222 for recirculation. The air flowing in the air conduit 210 is in thermal communication with the second heat transfer surface 208 of the first TED 204. The second heat transfer surface 208 generates heat which is transferred to the air flowing in the air conduit 210. Therefore, heated air is delivered to the passenger compartment of the vehicle from the first TED 204.

In a cooling mode, where the engine 188 is not operating and the electric motor is operating, the first TED 204 removes heat from the air stream. The pump 222 is operating to circulate the first fluid through the first conduit 166. The diverter valve 176 is positioned to militate against flow of the first fluid to the battery compartment 172 and permit flow to the heat exchanger 170. Heat is removed from the first fluid by the heat exchanger 170. The pump 198 of the second circuit 164 is not operating to circulate the first fluid through the second conduit 186. It is understood that if the engine 188 is operating, or if there is residual heat in the engine 188 requiring removal, the pump 198 can be operated to cause the first fluid to flow through the heat exchanger 190 and recirculate back to the pump 198. If this is necessary, the valve 196 is positioned to permit flow therethrough to recirculate the flow of the first fluid back to the pump 198.

The valve 182 is positioned to militate against flow of the first fluid from the engine 188 into thermal communication with the first heat transfer surface 206 of the first TED 204. The valve 226 is positioned to militate against flow through the first heat exchanger 212.

The valve 174 is positioned to permit flow of the first fluid from the heat exchanger 170 to the first heat transfer surface 206 of the first TED 204. The controller causes the current to the first TED 204 to flow to cause the first heat transfer surface 206 to generate heat which is absorbed by the first fluid. The first fluid then flows back to the pump 222 for recirculation. The air flowing in the air conduit 210 is in thermal communication with the second heat transfer surface 208 of the first TED 204. The second heat transfer surface 208 absorbs heat from the air flowing in the air conduit 210. Therefore, cooled air is delivered to the passenger compartment of the vehicle from the first TED 204.

Figure 7:
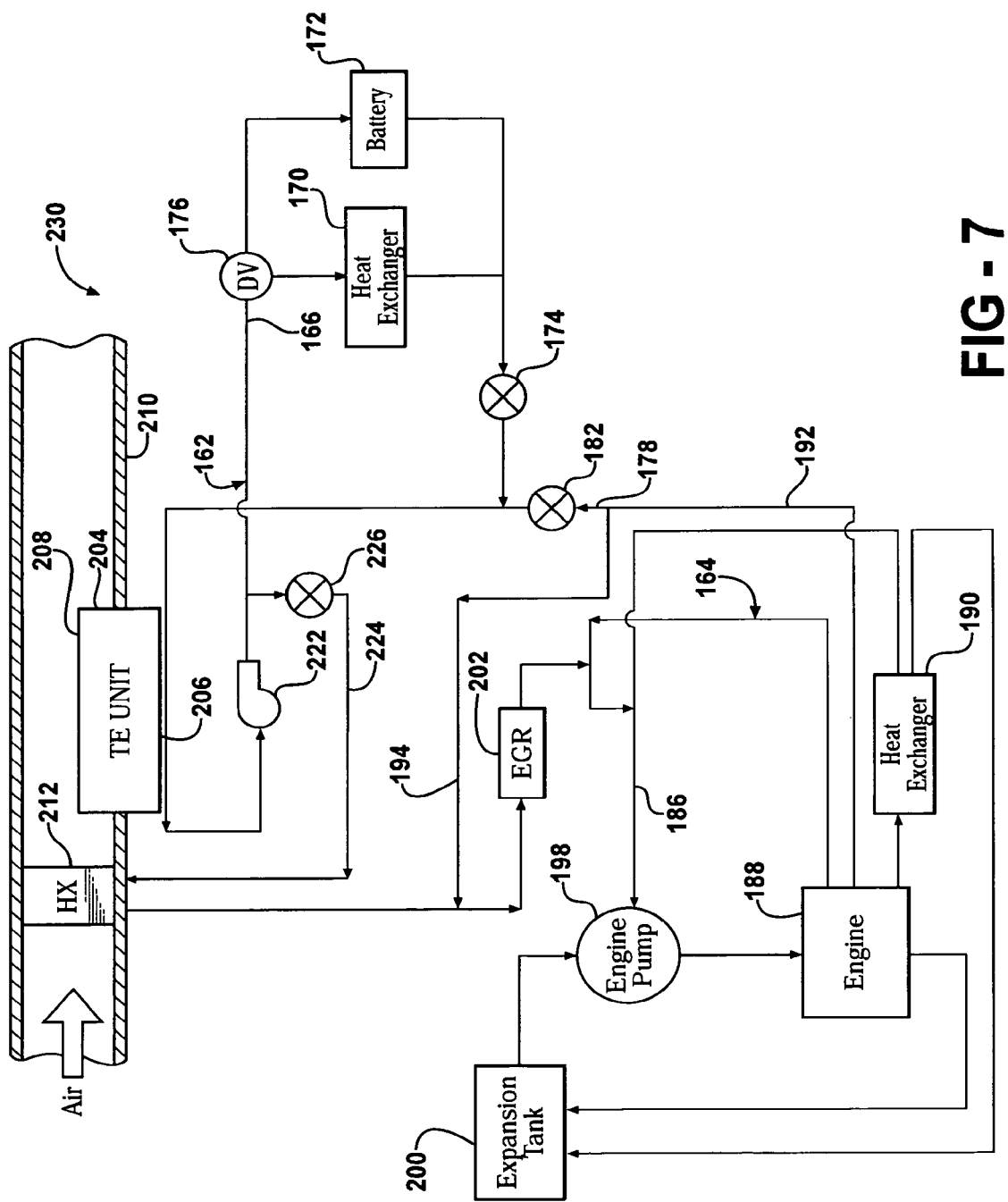
FIG. 7 is a schematic flow diagram of a HVAC system according to another embodiment of the invention.

FIG. 7 shows a heating ventilating, and air conditioning (HVAC) system 230 for supplying conditioned air to a passenger compartment of a vehicle according to another embodiment of the invention. Structure included from FIGS. 5 and 6 has the same reference numeral for clarity and a description thereof is not repeated.

In the embodiment shown, the valve 196 has been removed from the system. It is understood that more or fewer valves may be used as desired.

In operation, the system 230 conditions the air flowing from the source of air for supply of the conditioned air to the passenger compartment of the vehicle. A flow direction of the air from the source of air is indicated by the arrow in the air conduit 210. The system 230 can operate in a heating mode and a cooling mode. Additionally, if a second TED is added as discussed for FIGS. 2-4, or if the first TED 204 is disposed upstream of the first heat exchanger 190, the system 230 can operate in a demisting mode.

The operation of the system 230 is the same as described above for FIG. 6, except for the valve 196. The valve 196 has been removed in the system 230. Thus, it is not necessary to open a valve to permit recirculation of the flow of the first fluid through the second circuit 164.

Figure 8:
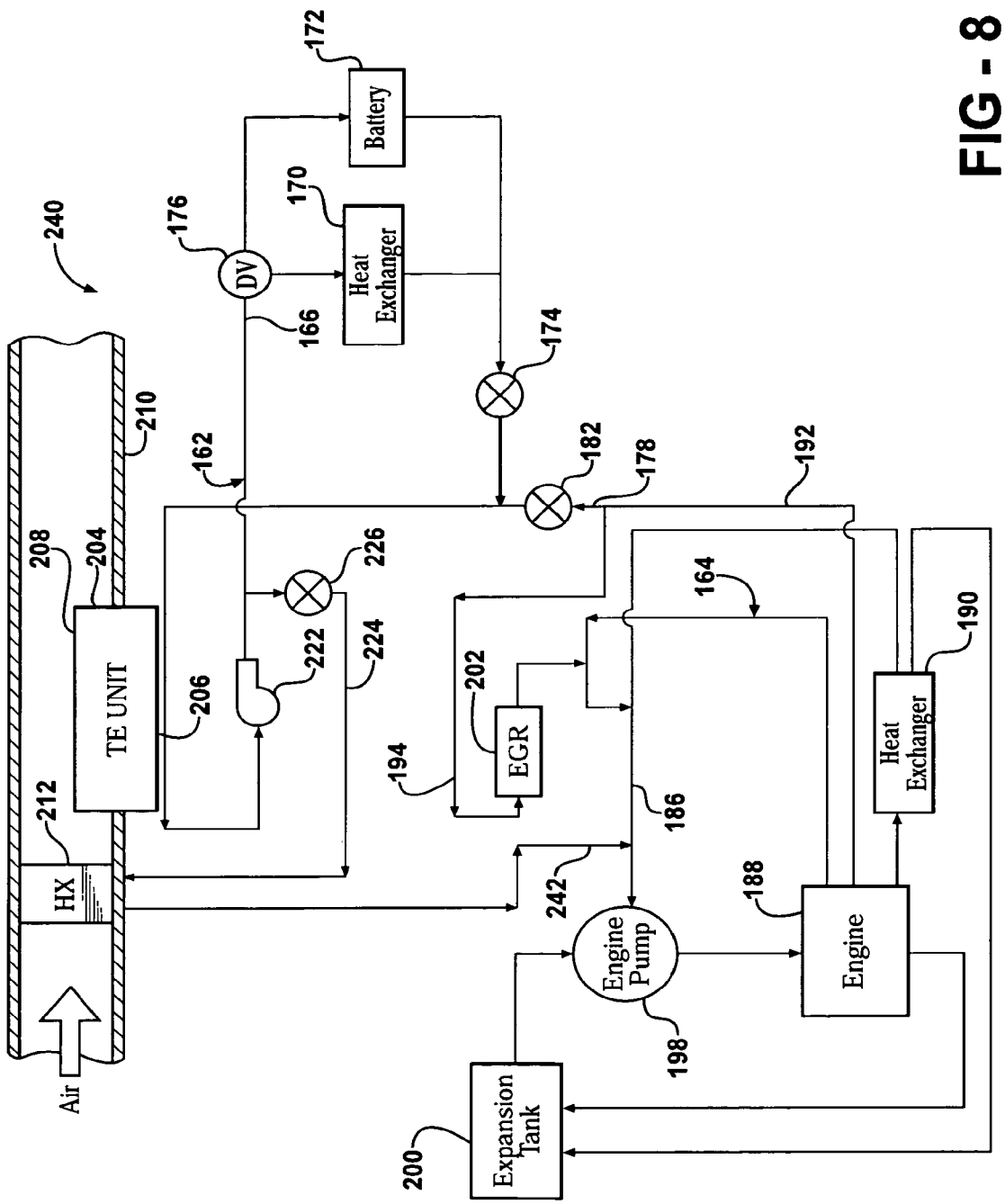
FIG. 8 is a schematic flow diagram of a HVAC system according to another embodiment of the invention.

FIG. 8 shows a heating ventilating, and air conditioning (HVAC) system 240 for supplying conditioned air to a passenger compartment of a vehicle according to another embodiment of the invention. Structure included from FIGS. 5, 6, and 7 has the same reference numeral for clarity and a description thereof is not repeated.

In the embodiment shown, a point at which a return conduit 242 connects to the second conduit 186 has been changed. The return conduit 242 connects directly into the second conduit 186, where the previous connection was made upstream of the exhaust gas heat recovery device 202. The operation of the system 240 is the same as described above for FIG. 7.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A method for supplying conditioned air to a compartment of a vehicle having an electric side comprising components relating to an electric motor for powering the vehicle and a fuel fed side comprising components relating to a fuel fed engine for powering the vehicle, the method comprising:
    circulating a first fluid in a first circuit in thermal communication with the electric side of the vehicle;
    circulating a second fluid in a second circuit in thermal communication with the fuel fed side of the vehicle;
    transferring thermal energy between at least a first heat transfer surface of at least a first thermoelectric device and at least one of the first circuit and the second circuit;
    transferring thermal energy between at least a second heat transfer surface of the first thermoelectric device and an air stream;
    transferring thermal energy between at least a first heat exchanger disposed in the air stream and the second fluid circuit; and
    selecting between the first circuit and the second circuit to transfer thermal energy between the first heat transfer surface of the first thermoelectric device and the first circuit or the second circuit;
    wherein at least the first circuit, the second circuit, the first thermoelectric device, and the first heat exchanger cooperate to condition the air stream.

2. The method of claim 1, further comprising providing a second heat exchanger disposed in the air stream, the second heat exchanger in thermal communication with a third conduit for conveying a third fluid therein, wherein the second heat transfer surface of the first thermoelectric device is in thermal communication with the third conduit.

3. The method of claim 2, further comprising providing a third heat exchanger disposed in the air stream, the third heat exchanger in thermal communication with the second fluid circuit.

4. The method of claim 2, further comprising providing a third heat exchanger disposed in the air stream, the third heat exchanger in thermal communication with the third conduit.

5. The method of claim 1, further comprising:
    providing an air conduit in communication with a passenger compartment of the vehicle; and
    supplying the air stream with a source of air.

6. The method of claim 5, wherein the first thermoelectric device is in direct thermal communication with the air conduit.

7. The method of claim 1, wherein the first circuit, the second circuit, the first thermoelectric device, and the first heat exchanger cooperate to heat, cool, and demist the air stream.

8. The method of claim 1, wherein the first fluid is a coolant.

9. The method of claim 8, wherein the first thermoelectric device is in direct thermal communication with the air conduit.

10. A method for providing conditioned air to a compartment of a vehicle, the method comprising:
    conveying a first fluid in a first conduit forming a first circuit in thermal communication with an electric side of the vehicle;
    conveying the first fluid in a second conduit forming a second circuit in thermal communication with a fuel fed side of the vehicle;
    conveying a second fluid in a third conduit;
    transferring thermal energy between at least a first heat transfer surface of at least a first thermoelectric device and one of the first conduit and the second conduit;
    transferring thermal energy between at least a second heat transfer surface of at least the first thermoelectric device and the third conduit;
    transferring thermal energy between at least a first heat exchanger disposed in an air stream and the second conduit;
    transferring thermal energy between a second heat exchanger disposed in the air stream downstream of the first heat exchanger and the third conduit; and
    selecting between the first circuit and the second circuit to transfer thermal energy between the first heat transfer surface of the first thermoelectric device and the first circuit or the second circuit;
    wherein the first conduit, the second conduit, the third conduit, the first thermoelectric device, the first heat exchanger, and the second heat exchanger cooperate to condition the air stream.

11. The method of claim 10, further comprising selectively transferring thermal energy between a third heat exchanger disposed in the air stream downstream of the second heat exchanger and a source of heat to provide selective heating of the air stream.

12. The method of claim 11, wherein the first heat exchanger provides a selective heating of the air stream, the second heat exchanger provides a selective heating and cooling of the air stream and the third heat exchanger provides a selective heating and cooling of the air stream.

13. The method of claim 11, wherein the source of heat is the second conduit.

14. The method of claim 11, wherein the source of heat is the third conduit.

15. The method of claim 11, further comprising conveying a third fluid in a fourth conduit, the fourth conduit in fluid communication with the third heat exchanger.

16. The method of claim 15, wherein the source of heat is the fourth conduit.

17. The method of claim 11, wherein the first conduit, the second conduit, the third conduit, the first thermoelectric device, the first heat exchanger, the second heat exchanger, and third heat exchanger cooperate to heat, cool, and demist the air stream.

18. A method for providing conditioned air to a compartment of a vehicle, the method comprising:
- conveying a first fluid in a first conduit forming a first circuit in thermal communications with an electric side of the vehicle;
- conveying the first fluid in a second conduit forming a second circuit in thermal communication with a fuel fed side of the vehicle;
- conveying a second fluid in a third conduit;
- transferring thermal energy between at least a first heat transfer surface of at least a first thermoelectric device and one of the first conduit and the second conduit;
- transferring thermal energy between at least a second heat transfer surface of at least the first thermoelectric device and the third conduit;
- selectively transferring thermal energy between at least a first heat exchanger disposed in an air stream and the second conduit, wherein the first heat exchanger provides a selective heating of the air stream;
- selectively transferring thermal energy between at least a second heat exchanger disposed in the air stream downstream of the first heat exchanger and the third conduit, wherein the second heat exchanger provides selective heating and cooling of the air stream;
- selectively transferring thermal energy between at least a third heat exchanger disposed in the air stream downstream of the second heat exchanger and a source of heat to provide selective heating of the air stream;
- selecting between the first circuit and the second circuit to transfer thermal energy between the first heat transfer surface of the first thermoelectric device and the first circuit or the second circuit; and
- wherein the first conduit, the second conduit, the third conduit, the first thermoelectric device, the first heat exchanger, the second heat exchanger, and the third heat exchanger cooperate to condition the air stream.

19. The method of claim 18, further comprising conveying a third fluid in a fourth conduit, wherein the fourth conduit provides fluid communication between the third heat exchanger and the source of heat.

20. The method of claim 18, wherein the first conduit, the second conduit, the third conduit, the first thermoelectric device, the first heat exchanger, the second heat exchanger, and the third heat exchanger cooperate to heat, cool, and demist the air stream.

21. The method of claim 1, wherein the fuel fed side of the vehicle comprises an internal combustion engine.

22. The method of claim 1, wherein selecting between the first circuit and the second circuit to transfer thermal energy between the first heat transfer surface of the first thermoelectric device and the first circuit or the second circuit comprises operating a valve system configured to control flow of the first fluid and the second fluid.

23. The method of claim 1, further comprising operating a temperature control system in one or more of a plurality of modes, and wherein operating in the plurality of modes comprises:
- operating a flow control system, in a first mode of operation, to cause the first fluid to circulate through the first circuit to a battery compartment of the electric side of the vehicle and to the first heat transfer surface of the first thermoelectric device; and
- operating the flow control system, in a second mode of operation, to cause the second fluid to circulate through the second circuit to an internal combustion engine of the fuel fed side of the vehicle and to the first heat transfer surface of the first thermoelectric device; and
- wherein at least the first circuit, the second circuit, the first thermoelectric device, the first heat exchanger, and the flow control system cooperate to heat the air stream in the first and second modes of.

24. The method of claim 23, further comprising directing current in a first polarity to the first thermoelectric device in the first and second modes of operation to transfer thermal energy from the first heat transfer surface to the second heat transfer surface.

25. The method of claim 23, further comprising directing the air stream to a passenger compartment of the vehicle in the first and second modes of operation.

26. The method of claim 23, wherein operating in the first mode of operation further comprises operating the flow control system to cause the second fluid to circulate through the second circuit to the internal combustion engine and to the first heat exchanger.

27. The method of claim 23, wherein operating in the second mode of operation further comprises operating the flow control system to cause the second fluid to circulate through the second circuit to the first heat exchanger.

28. The method of claim 23, wherein operating the temperature control system in one or more of the plurality of modes further comprises:
- operating the flow control system, in a third mode operation, to cause the second fluid to circulate through the second circuit to the internal combustion engine and to the first heat exchanger; and
- wherein at least the second circuit, the first heat exchanger, and the flow control system cooperate to heat the air stream in the third mode of operation.

29. The method of claim 23, wherein operating the temperature control system in one or more of the plurality of modes further comprises:
- operating the flow control system, in a fourth mode of operation, to cause the first fluid to circulate through the first circuit to a low temperature core in thermal communication with the first circuit and to the first heat transfer surface of the first thermoelectric device; and
- directing current, in the fourth mode, in a second polarity to the first thermoelectric device to transfer thermal energy from the second heat transfer surface to the second heat transfer surface; and
- wherein at least the first circuit, the second circuit, the first thermoelectric device, the first heat exchanger, and the flow control system cooperate to cool or demist the air stream in the fourth mode of operation.

30. The method of claim 29, wherein operating in the fourth mode of operation further comprises operating the flow control system to selectively direct fluid either to the electric side of the vehicle or the low temperature core.

31. The method of claim 29, wherein operating in the fourth mode of operation further comprises operating the flow control system to cause the second fluid to circulate through the second circuit to the internal combustion engine and to a third heat exchanger.

32. The method of claim 10, further comprising operating a temperature control system in one or more of a plurality of modes, and wherein operating in the plurality of modes comprises:
    operating in a first mode to:
        operate a flow control system to cause the first fluid to circulate through the first conduit to a battery compartment of the electric side of the vehicle and to the first heat transfer surface of the first thermoelectric device;
        operate the flow control system to cause the first fluid to circulate through the second conduit to an internal combustion engine of the fuel fed side of the vehicle and to the first heat exchanger;
        direct current in a first polarity to the first thermoelectric device to transfer thermal energy from the first heat transfer surface to the second heat transfer surface; and
        direct the air stream to a passenger compartment of the vehicle; operating in a second mode to:
        operate the flow control system to cause the first fluid to circulate through the second conduit to the internal combustion engine, to the first heat transfer surface of the first thermoelectric device, and to the first heat exchanger;
        direct current in the first polarity to the first thermoelectric device to transfer thermal energy from the first heat transfer surface to the second heat transfer surface; and
        direct the air stream to the passenger compartment of the vehicle; operating in a third mode to:
        operate the flow control system to cause the first fluid to circulate through the second conduit to the internal combustion engine and to the first heat exchanger;
        direct the air stream to the passenger compartment of the vehicle; and operating in a fourth mode to:
        operate the flow control system to cause the first fluid to circulate through the first conduit to a heat sink in thermal communication with the first conduit and to the first heat transfer surface of the first thermoelectric device;
        direct current in a second polarity of the first thermoelectric device to transfer thermal energy from the second heat transfer surface to the first heat transfer surface; and
        direct the air stream to the passenger compartment of the vehicle;
    wherein at least the first conduit, the second conduit, the third conduit, the first thermoelectric device, the first heat exchanger, the second heat exchanger, and the flow control system cooperate to heat the air stream in the first, second, and third modes of operation; and
    wherein at least the first conduit, the second conduit, the third conduit, the first thermoelectric device, the first heat exchanger, the second heat exchanger, and the flow control system cooperate to cool and demist the air stream in the fourth mode of operation.

33. The method of claim 32, wherein operating in the fourth mode of operation further comprises operating the flow control system to cause the first fluid to circulate through the second conduit to a third heat exchanger disposed in the air stream downstream of the second heat exchanger.

34. The method of claim 18, further comprising operating a temperature control system in one or more of a plurality of modes, and wherein operating in the plurality of modes comprises:
    operating in a first mode to:
        operate a flow control system to cause the first fluid to circulate through the first conduit to a battery compartment of the electric side of the vehicle and to the first heat transfer surface of the first thermoelectric device;
        operate the flow control system to cause the first fluid to circulate through the second conduit to an internal combustion engine of the fuel fed side of the vehicle and to the first heat exchanger;
        direct current in a first polarity to the first thermoelectric device to transfer thermal energy from the first heat transfer surface to the second heat transfer surface; and
        direct the air stream to a passenger compartment of the vehicle;
    operating in a second mode to:
        operate the flow control system to cause the first fluid to circulate through the second conduit to the internal combustion engine, to the first heat transfer surface of the first thermoelectric device, and to the first heat exchanger;
        direct current in the first polarity to the first thermoelectric device to transfer thermal energy from the first heat transfer surface to the second heat transfer surface; and
        direct the air stream to the passenger compartment of the vehicle; operating in a third mode to:
        operate the flow control system to cause the first fluid to circulate through the second conduit to the internal combustion engine and to the first heat exchanger;
        direct the air stream to the passenger compartment of the vehicle; and operating in a fourth mode to:
        operate the flow control system to cause the first fluid to circulate through the first conduit to a heat sink in thermal communication with the first conduit and to the first heat transfer surface of the first thermoelectric device and;
        direct current in a second polarity of the first thermoelectric device to transfer thermal energy from the second heat transfer surface to the first heat transfer surface; and
        direct the air stream to the passenger compartment of the vehicle;
    wherein at least the first conduit, the second conduit, the third conduit, the first thermoelectric device, the first heat exchanger, the second heat exchanger, and the flow control system cooperate to heat the air stream in the first, second, and third modes of operation; and
    wherein at least the first conduit, the second conduit, the third conduit, the first thermoelectric device, the first heat exchanger, the second heat exchanger, and the flow control system cooperate to cool and demist the air stream in the fourth mode of operation.

35. The method of claim 34, wherein operating in the fourth mode of operation further comprises operating the flow control system to cause the first fluid to circulate through the second conduit to the third heat exchanger.

* * * * *